US011636085B2

(12) United States Patent
Yan et al.

(10) Patent No.: US 11,636,085 B2
(45) Date of Patent: Apr. 25, 2023

(54) DETECTION AND UTILIZATION OF SIMILARITIES AMONG TABLES IN DIFFERENT DATA SYSTEMS

(71) Applicant: INTERNATIONAL BUSINESS MACHINES CORPORATION, Armonk, NY (US)

(72) Inventors: Xiao Chao Yan, Shanghai (CN); Bei Bei Zhan, Shanghai (CN); Wu Cheng, Wuhan (CN); Yujia Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/463,643

(22) Filed: Sep. 1, 2021

(65) Prior Publication Data
US 2023/0076744 A1 Mar. 9, 2023

(51) Int. Cl.
*G06F 16/248* (2019.01)
*G06F 40/30* (2020.01)
(Continued)

(52) U.S. Cl.
CPC ........ *G06F 16/2282* (2019.01); *G06F 16/248* (2019.01); *G06F 16/2456* (2019.01);
(Continued)

(58) Field of Classification Search
CPC ............. G06F 16/2282; G06F 16/2456; G06F 16/24573; G06F 16/248; G06F 40/30; G06K 9/6226
See application file for complete search history.

(56) References Cited

U.S. PATENT DOCUMENTS 7,242,810 B2 7/2007 Chang
9,633,076 B1 4/2017 Morton
(Continued)

FOREIGN PATENT DOCUMENTS

CN 107807996 3/2018

OTHER PUBLICATIONS

Wikipedia-Boxplot, https://en.wikipedia.org/wiki/Box_plot, 8 pages, last edited on Oct. 27, 2021.
(Continued)

*Primary Examiner* — Wilson Lee
(74) *Attorney, Agent, or Firm* — Schmeiser, Olsen & Watts, LLP; Michael A. Petrocelli

(57) ABSTRACT

A method, computer program product, and computer system for detection and utilization of similarities among tables in multiple data systems that include a first data system and a second data system. A semantic dataset is generated. A first measure (X) of similarity between semantic data in columns of the first and second data systems is computed using the semantic dataset. A first, different measure (Y) of similarity between semantic data in columns of the first and second data systems is computed using the semantic dataset. A third measure (Z) similarity between columns of the first and second data systems is computed based on data in cells within the columns. A weighted combination (U) of X, Y, and Z between the columns of tables in the first and second data systems is computed. X, Y, Z, U or combinations thereof are used to improve a computer system.

20 Claims, 14 Drawing Sheets

(51) Int. Cl.
  *G06F 16/22*     (2019.01)
  *G06F 16/2457*   (2019.01)
  *G06K 9/62*      (2022.01)
  *G06F 16/2455*   (2019.01)

(52) U.S. Cl.
  CPC ........ *G06F 16/24573* (2019.01); *G06F 40/30* (2020.01); *G06K 9/6215* (2013.01); *G06K 9/6226* (2013.01)

(56) References Cited

U.S. PATENT DOCUMENTS

| | | | | |
|---|---|---|---|---|
| 9,633,696 | B1* | 4/2017 | Miller | G11B 27/10 |
| 9,710,544 | B1* | 7/2017 | Smith | G06F 16/36 |
| 9,836,183 | B1* | 12/2017 | Love | G06F 16/904 |
| 10,268,735 | B1 | 4/2019 | White | |
| 11,042,776 | B1* | 6/2021 | Buhler | G06V 10/945 |
| 2005/0265607 | A1 | 12/2005 | Chang | |
| 2015/0095349 | A1 | 4/2015 | Sturzoiu | |
| 2016/0042253 | A1* | 2/2016 | Sawhney | G06K 9/6224 382/190 |
| 2016/0277368 | A1* | 9/2016 | Narayanaswamy | G06F 21/6209 |
| 2017/0264640 | A1* | 9/2017 | Narayanaswamy | H04L 63/105 |
| 2017/0353477 | A1* | 12/2017 | Faigon | G06F 21/6209 |
| 2018/0204111 | A1* | 7/2018 | Zadeh | G06N 3/0436 |
| 2019/0171947 | A1* | 6/2019 | Mohan | G06N 5/022 |
| 2019/0317938 | A1 | 10/2019 | Agarwalla | |
| 2020/0075135 | A1* | 3/2020 | Otaki | G06F 16/285 |

OTHER PUBLICATIONS

Mell, Peter et al.; "The NIST Definition of Cloud Computing;" National Institute of Standards and Technology; Special Publication 800-145; Sep. 2011; 7 pages.

Jason Brownlee, How to Calculate th KL Divergence for Machine Learning, Oct. 18, 2019, Retrieved from Internet: https://machinelearningmastery.com/divergence-between-probability-distributions/, Retrieved on Aug. 9, 2021, 4 pages.

Wikipedia, Medcouple, Retrieved from Internet: https://en.wikipedia.org/wiki/Medcouple, Retrieved on Aug. 9, 2021, 11 pages.

Kullback-Leibler divergence, Wikipedia, Retrieved from Internet: https://en.wikipedia.org/wiki/Kullback%E2%80%93Leibler_divergence, Retrieved on Aug. 9, 2021, 16 pages.

Hubert et al., An Adjusted Boxplot for Skewed Distributions, Oct. 30, 2007, Retrieved from Internet: https://wis.kuleuven.be/stat/robust/papers/2008/adjboxplot-revision.pdf, Retrieved on Aug. 9, 2021, 26 pages.

WikipediA, Rejection Sampling, Retrieved from Internet: http://en.wikipedia.org/wiki/Rejection_sampling, Retrieved on Aug. 12, 2021, 9 pages.

A Summary of measures of data similarity, Oct. 30, 2016, Retrieved from Internet: https://blog.csdn.net/guoziqing506/article/details/51779536, Retrieved on Aug. 12, 2021, 7 pages.

Koutra et al., Algorithms for Graph Similarity and Subgraph Matching, Dec. 4, 2011, 50 pages.

The principle of the WMD algorithm, Oct. 25, 2019, Retrieved from the Internet: https://blog.csdn.net/sinat_24330297/article/details/102738810, Retrieved on Aug. 12, 2021, 7 pages.

Jerry R. Van Aken, A Statistical Learning Algorithm for Word Segmentation, https://arxiv.org/ftp/arxiv/papers/1105/1105.6162.pdf, 30 pages.

Jerry R. Van Aken, A Statistical Learning Algorithm for Word Segmentation, https://arxiv.org/ftp/arxiv/papers/1105/1105.6162.pdf, 30 pages (previously submitted), Published May 30, 2011.

Jerry R. Van Aken, A Statistical Learning Algorithm for Word Segmentation, Retrieved from Internet on Jan. 19, 2023, https://www.semanticscholar.org/paper/A-statistical-learning-algorithm-for-word-Aken/fc2f78185e03be7bcdf4d84de389c43aea3dfbff, Published May 30, 2011, 4 pages.

* cited by examiner

DETECTION AND UTILIZATION OF SIMILARITIES AMONG TABLES IN DIFFERENT DATA SYSTEMS

BACKGROUND

Embodiments of the present invention relates in general to analysis and utilization of multiple data systems. More specifically, embodiments of the present invention relate to detection and utilization of similarities among tables in different data systems.

SUMMARY

Embodiments of the present invention provide a method, a computer program product and a computer system, for detection and utilization of similarities among tables in a plurality of data systems that include a first data system and a second data system. Each data system is a different data system that comprises a plurality of tables. Each table in each data system comprises a table title and a plurality of columns and multiple rows comprising a header row and a plurality of data rows. Each header row comprises a column name for each column. Each table title and each column name has semantic metadata comprising text. One or more processors of a computer system generate a semantic dataset comprising a set of keywords and a set of binary values of 1 or 0 denoting a presence or absence, respectively, of each keyword in the semantic metadata in the column names. Each keyword in the set of keywords is a unique keyword within the set of keywords. The one or more processors compute, using the semantic dataset in conjunction with the semantic metadata in the column names, a first measure (X) of similarity between the columns in the tables in the first data system and the columns in the tables in the second data system. The one or more processors compute, using the semantic dataset in conjunction with the semantic metadata in the column names, a second measure (Y) of similarity between the columns in the tables in the first data system and the columns in the tables in the second data system. The first measure X and the second measure Y are different measures of similarity. The one or more processors compute, based on data in cells within columns in the tables in the both the first data system and the second data system, a third measure (Z) of similarity between the columns in the tables in the first data system and the columns of in the tables in the second data system. The one or more processors compute a weighted combination (U) of X, Y, and Z between the columns in the tables in the first data system and the columns in the tables in the second data system. The one or more processors use one or more computed parameters selected from the group consisting of X, Y, Z, U and combinations thereof to improve the computer system.

DETAILED DESCRIPTION

Figure 1:
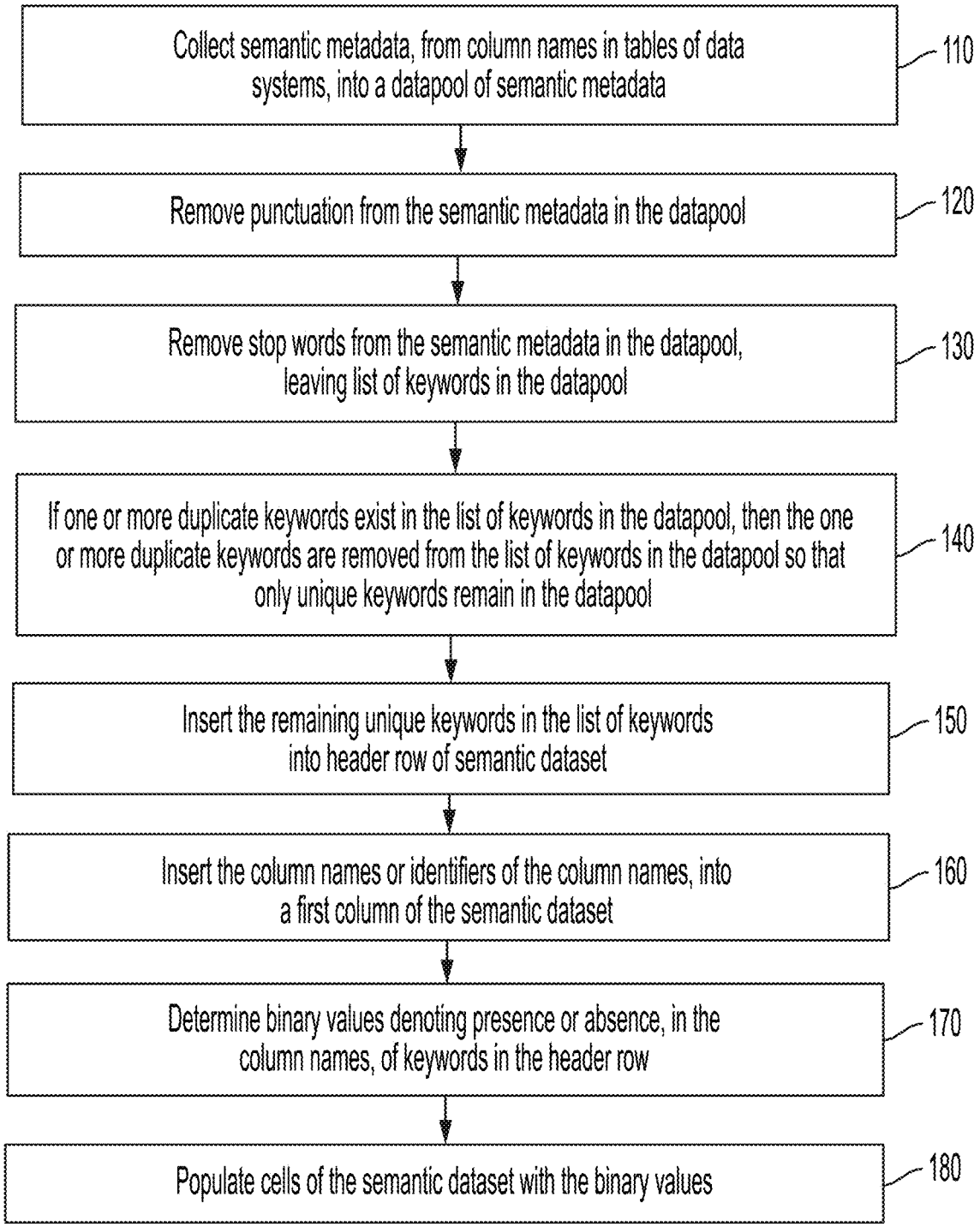
FIG. 1 is a flow chart describing a method of generating a semantic dataset comprising a set of keywords appearing in column names of all columns in all tables in a plurality of data systems, in accordance with embodiments of the present invention.

A data system is a data store that includes multiple tables. A large number of independent data systems may be generated at different phases of an enterprise's internal Information Technology (IT) construction, becoming data islands. Embodiments of the present invention can assist in building a data warehouse more efficiently and uniformly, by beneficially exploiting similarities among tables in the different data systems.

Embodiments of the present invention relate to a plurality of data systems (e.g., 2 data systems, 3 data systems, 4 data systems, etc.).

Each data system may comprise a database system that manages a database that includes a plurality of tables (e.g., 2 tables, 3 tables, 4 tables, etc.). Managing a database includes managing the tables of the database such as by, inter alia, performing operations on the data in the tables. In one embodiment, each database may independently be a relational database or a flat file database, as known by a person of ordinary skill in the art. A relational database may use a Relational Database Management System (RDBMS) to access the data. In one embodiment, the RDBMS uses Structured Query Language (SQL) to manage the data in the tables. Examples of an RDBMS include Oracle®, MySQL®, and DB2®. Examples of flat file databases include NoSQL and JSON.

A table of the present invention is a data structure comprising a plurality of columns and a plurality of rows. A "column" may alternatively be referred to as a "field" of the table, wherein "column" and "field" have the same meaning. Each table has a title which is text that describes the table. Each column of each table has a column name which is text that describes the data in the column. The title and column names of a table are semantic metadata, in contrast with the actual data in the cells of the table.

In one embodiment, one or more data systems of the plurality of data systems may each be a data island in a computing device that has limited external connectivity, which limits, but does not prevent, movement of data from the data island to other computing devices. It is assumed herein that metadata and actual data in tables within any such data island may be accessed from computers and other devices for implementing embodiments of the present invention.

Embodiments of the present invention compute three measures of similarity between any two tables in different data systems of the plurality of data systems.

A first measure of similarity (X) is between any two tables in the different data systems and is based on a first comparative analysis of the text in the column names of the two tables, wherein the title of the tables may optionally be included in the first comparative analysis.

A second measure of similarity (Y) is between any two tables in the different data systems and is based on a second, different comparative analysis of the text in the column names of the two tables, wherein the title of the tables may optionally be included in the second comparative analysis.

A third measure of similarity (Z) is between any two tables in the different data systems and is based on statistical comparison of the data in columns in the two tables.

Embodiments of the present invention combine the three measures of similarity expressed as function of X, Y, and Z and denoted as U(X,Y,Z). In one embodiment, U is a weighted linear combination of X, Y and Z expressed as U=aX+bY+cZ, wherein a, b, and c are constants serving as weights for X, Y, and Z.

A semantic dataset is generated before Similarity X and Similarity Y are calculated. The semantic dataset is a data structure that includes the keywords (i.e., the most significant words) in the column names of all columns of all tables of the plurality of tables in the plurality of data systems, and optionally further includes the keywords in the titles of all tables of the plurality of tables in the plurality of data systems. The calculation of Similarity X and Similarity Y use the semantic dataset.

In the present disclosure, "table" refers to a table of the plurality of tables of the present invention, wherein "Table" refers to an actual table in the present disclosure (e.g., Table 1") discussed next.

In one embodiment, the semantic dataset has the following general data structure shown in Table 1.

TABLE 1

General Structure of Semantic Dataset

| Keywords → | W_1 | ... | W_n | ... | W_N |
|---|---|---|---|---|---|
| S_111 → | B_111_1 | ... | B_111_n | ... | B_111_N |
| . | . | | . | | . |
| . | . | | . | | . |
| . | . | | . | | . |

TABLE 1-continued

General Structure of Semantic Dataset

| Keywords → | W_1 | ... | W_n | ... | W_N |
|---|---|---|---|---|---|
| S_dtc → | B_dtc_1 | ... | B_dtc_n | ... | B_dtc_N |
| . | . | | . | | . |
| . | . | | . | | . |
| . | . | | . | | . |
| S_DTC → | B_DTC_1 | ... | B_DT_n | ... | B_DTC_N |

The notation used in Table 1 is as follows.

Index n points to keyword n (n=1, 2, . . . N), N=number of keywords.

Index d points to data system d (d=1, 2, . . . , D), D=number of data systems

Index t points to table t (t=1, 2, . . . , T), T=number of tables.

Index c points to column c, C=number of columns (c=1, 2, . . . , C).

W_n denotes keyword n (n=1, 2, . . . , N).

W_1, . . . , W_n, . . . , W_N form a header row in Table 1.

S_dtc denotes the semantic metadata (original text data) in the column name of column c in table t in data system d.

B_dtc_n is a binary value of 1 or 0, B_dtc_n=1 if keyword W_n is included in the semantic metadata S_dtc; B_dtc_n=0 if keyword W_n is not included in the semantic metadata S_dtc.

N≥2, D≥2, T≥2 and C≥1 in each data system and can differ in different data systems, so T is generally a function the data system index d.

The number of columns C can differ for different tables in different data systems, and the number of columns C can differ for different tables in different data systems, so C is generally a function of the data system index d and the table index t.

Although S_dtc denotes the semantic metadata in a column name, S_dtc in the first column of Table 1 is either a symbolic representation of the semantic metadata (i.e., "S_dtc" literally) or the actual semantic metadata in the column name.

Table 2 is an exemplary semantic dataset for an embodiment characterized by three data systems (D=3). The semantic metadata in only three columns are represented in Table 2 for simplicity, even though the semantic metadata in the remaining columns in the three data systems exist in the actual semantic dataset. The three columns (S_111, S_243, S_325) in tables of the T tables are represented as rows in Table 2. S_111 denotes the semantic metadata in the column name of column 1 in table 1 of data system 1. E_243 denotes the semantic metadata in the column name of column 3 in table 4 of data system 2. S_325 denotes the semantic metadata in the column name of column 5 in table 2 of data system 3.

TABLE 2

Exemplary semantic dataset

| Semantic Metadata ↓/Keywords → | User | Group | Client | Age | Name |
|---|---|---|---|---|---|
| S_111 ("This is User: a Name") | 1 | 0 | 0 | 0 | 1 |
| S_243 ("Client, the Name") | 0 | 0 | 1 | 0 | 1 |
| S_325 ("Group.") | 0 | 1 | 0 | 0 | 0 |

The semantic metadata in the column names in Table 2, before a keyword extraction process is implemented, are: S_111 ("This is User: a Name"); S_243: ("Client, the Name"); and S_325: ("Group"). In addition, the column name of another column (not shown in Table 2) is "Age".

After removal of punctuation (e.g., commas, colons, semi-colons, periods, question marks, etc.), removal of the 4 unimportant words called stop words ("This", "is", "a", "the"), and removal of duplicates of keywords ("Name"), the remaining keywords words are: "User", "Group", "Client", "Age" and "Name" as shown in the header row of Table 2.

The binary values 0 and 1 in Table 2 describe the non-existence and existence, respectively, of the keyword in the column name. For example, "Name" exists in the semantic metadata of S_111 and S_243 but does not exist in the semantic metadata of S325. As another example, "Client" exists in the semantic metadata of S_243 but does not exist in the semantic metadata of S_111 and S_325.

Although the semantic dataset of Table 1 and of Table 2 includes binary values B_dtc_n for the column names of columns in the tables in the data systems, the semantic metadata in Table 1 and Table 2 can be extended to include the table titles for tables 1, 2, ..., T in each data system 1, 2, ..., D, by processing each table title in the same manner as the semantic metadata in the column name is processed. For this embodiment, each title appears as an additional row in Table 1 and Table 2 and may be symbolically represented as Title_dt for table t of data system d.

FIG. 1 is a flow chart describing a method of generating a semantic dataset of unique keywords appearing in column names of all columns in all tables in the plurality of data systems, in accordance with embodiments of the present invention. The method described in FIG. 1 comprises steps 110-180 and assumes the existence of column names C_dtc of the associated columns in tables and data systems over the ranges of: (d=1, 2, ... D), (t=1, 2, ..., T) and (c=1, 2, ..., C), as described supra.

Step 110 collects all of the sematic metadata (S_dtc) in the column names S_dtc of all columns in all tables in the plurality of data systems. Collecting the semantic metadata includes placing the semantic metadata into a datapool of semantic metadata in memory or storage for subsequent processing. In one embodiment, step 120 may also optionally collect the semantic metadata of the table titles of all tables in the plurality of data systems.

Step 120 removes all punctuation (e.g., commas, colons, semicolons, periods, question marks, etc.) from the datapool.

Step 130 removes all stop words from the pool of semantic information. A stop word is a word that is sufficiently common that that the stop word does not provide useful information. Examples of stop words may include, inter alia, "a", "in", "the", "for", etc. In one embodiment, the stop words in the datapool of semantic metadata may be found by comparing the words in the datapool of semantic metadata with a dictionary or file of stop words.

The words of semantic metadata that remain after the punctuation and stop words have been removed from the datapool of semantic metadata form a list of keywords.

If one or more duplicate keywords exist in the list of keywords in the datapool, then step 140 removes the one or more duplicate keywords from the list of keywords in the datapool so that only unique keywords remain in the list of keywords in the datapool.

Step 150 inserts the unique keywords in the list of keywords into the header row of the semantic dataset.

Step 160 inserts the remaining column names, (or identifiers thereof), and optionally the table titles (or identifiers thereof) into the first column of the semantic dataset.

Step 170 determines the binary values (B_dtc_n) denoting presence or absence, in the column names, of keywords in the header row of the semantic dataset.

Step 180 populates the cells of the semantic dataset with the binary values.

Although, the semantic dataset may be a table (e.g., Table 1 or Table 2 as described supra), the semantic dataset may be any data structure that includes the binary values B_dtc_n or its equivalent such as yes/no instead of I/O, which enables a determination of whether or not a given keyword exists in a given column name or in a given table title.

Figure 2:
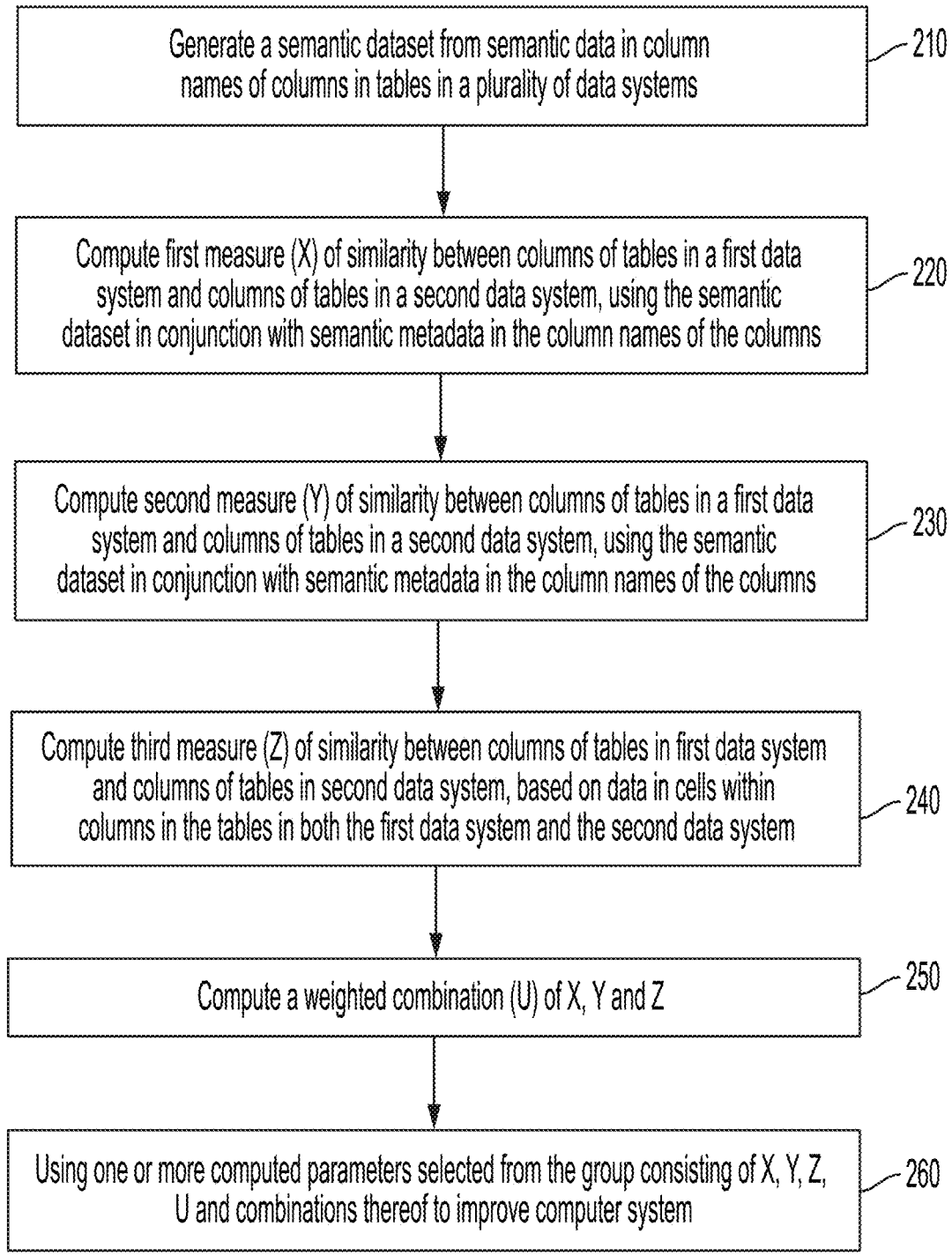
FIG. 2 is a flow chart describing a method for detecting and utilizing similarities among tables in a plurality of data systems, in accordance with embodiments of the present invention.

FIG. 2 is a flow chart describing a method for detecting and utilizing similarities among tables in a plurality of data systems, in accordance with embodiments of the present invention. The method described in FIG. 1 comprises steps 210-260.

Step 210 generates a semantic dataset from semantic metadata in columns of the tables stored in the plurality of data systems, as described supra in conjunction with semantic dataset generation method of FIG. 1 and the illustrated semantic dataset in Table 1 and Table 2. Optionally, the semantic dataset may also include semantic metadata obtained from the titles of the tables.

Step 220 computes a first measure (X) of similarity between columns of tables in a first data system and columns of tables in a second data system, using the semantic dataset in conjunction with semantic metadata in the column names of the columns. A flow chart describing how step 220 may be implemented is described in FIG. 3.

Step 230 computes a second measure (Y) of similarity between columns of tables in a first data system and columns of tables in a second data system, using the semantic dataset in conjunction with semantic metadata in the column names of the columns. A flow chart describing how step 230 may be implemented is described in FIG. 4.

Step 240 computes a third measure (Z) of similarity between columns of tables in a first data system and columns of tables in a second data system, based on data in cells within columns in the tables in both the first data system and the second data system. Flow charts describing how step 240 may be implemented is described in FIGS. 5.6-9 and 11.

Step 250 computes a weighted combination (U) of X, Y and Z.

Step 260 uses one or more computed parameters selected from X, Y, Z, U and combinations thereof to improve a computer system.

Steps 250 and 260 collectively define practical applications as described infra.

Figure 3:
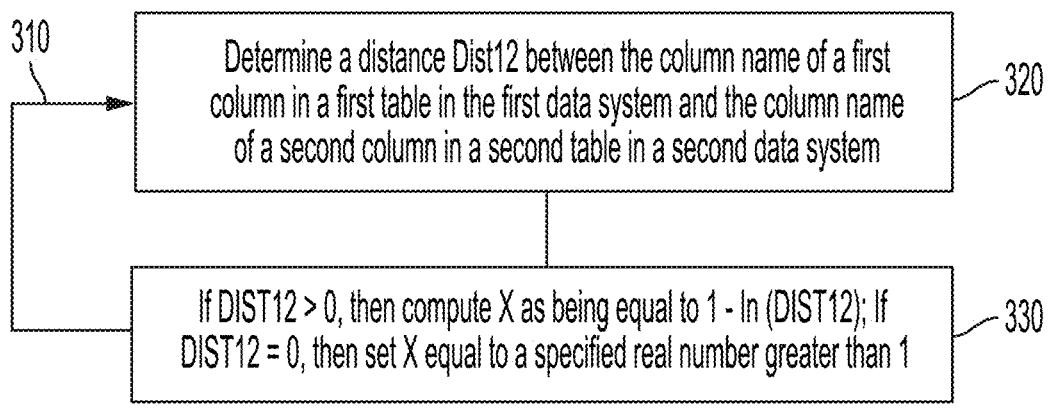
FIG. 3 is a flow chart describing a process, using the semantic dataset, for computing a first measure (X) of similarity between columns of tables in a first data system and columns of tables in a second data system, in accordance with embodiments of the present invention.

FIG. 3 is a flow chart describing a process, using the semantic dataset, for computing the first measure (X) of similarity between columns of tables in a first data system A and columns of tables in a second data system B, in accordance with embodiments of the present invention The process described in FIG. 3 implements step 220 of FIG. 2 and comprises steps 320 and 330 performed in each iteration of a loop 310.

The following notational definitions are used.

A denotes the first data system.

Ai denotes table i in first data system A, wherein i=1, 2, ..., I, wherein I is the total number of tables in first data system A, and wherein I≥2.

Ai_k denotes column k in table Ai in first data system A, wherein k=1, 2, ..., K, wherein K is the total number of columns in table Ai in first data system A, and wherein K≥2.

B denotes the second data system.

Bj denotes table Bj in second data system B, wherein j=1, 2, ..., J, wherein J is the total number of tables in second data system B, and wherein J≥2.

Bj_m denotes column m in table Bj in second data system B, wherein m=1, 2, ... M, wherein M is the total number of columns in Table Bj in second data system B, and wherein M≥2.

Loop 310 iterates over a pair of columns comprising a first column in a first table in a first data system and a second column in a second table in a second data system. The first data system and the second data system are different data systems.

In each iteration of the loop 310 in which steps 320 and 330 are executed, the combination of the first column in the first table in the first data system and the second column in the second table in the second data system is changed (i.e., the combination of columns changes in each iteration).

Step 310 determine a Euclidean distance Dist12 between the column name of the first column in the first table in the first data system and the column name of the second column in the second table in the second data system If DIST12>0, then step 330 computes X as being equal to 1−ln (DIST12). If DIST12=0 corresponding to the column name of the first and second columns comprising identical semantic metadata, then step 330 computes X as being set equal to a specified real number R greater than 1 (e.g., R=2, 5, 10, 25, 50, 100, etc.). It is noted that 1−ln (DIST12) cannot be used for DIST12=0 because ln (0) is infinity.

In one embodiment DIST12 is a Euclidean distance.

The output of step 330 is illustrated in Table 3 for an example in which the first data system A has 6 tables and the second data system B has 5 tables. The 6 tables in data system A. and the 5 tables in data system B, each table having 3 columns. Note that A6_2 represents column 2 in table 6 of data system A, and B2_1 represents column 1 in table 2 of data system B. Table 3 assumes that DIST12 is a Euclidean distance.

TABLE 3

First Similarity (X)

|      | A1_1 | A1_2 | A1_3 | A2_1 | A2_2 | ... | A6_1 | A6_2 | A6_3 |
|------|------|------|------|------|------|-----|------|------|------|
| B1_1 | 0.2  | 0.3  | 0.3  | 0.6  | 0.6  |     | 0.1  | 0.2  | 0.3  |
| B1_2 | 0.3  | 0.4  | 0.6  | 0.8  | 0.7  |     | 0.3  | 0.3  | 0.2  |
| B1_3 | 0.1  | 0.2  | 0.3  | 0.6  | 0.8  |     | 0.1  | 0.2  | 0.3  |
| B2_1 | 0.3  | 0.3  | 0.2  | 0.4  | 0.2  |     | 0.3  | 0.3  | 0.2  |
| B2_2 | 0.1  | 0.2  | 0.3  | 0.2  | 0.4  |     | 0.1  | 0.2  | 0.3  |
| ...  |      |      |      |      |      |     |      |      |      |
| B5_1 | 0.1  | 0.2  | 0.3  | 0.2  | 0.1  |     | 0.1  | 0.2  | 0.3  |
| B5_2 | 0.3  | 0.3  | 0.2  | 0.2  | 0.3  |     | 0.3  | 0.3  | 0.2  |
| B5_3 | 0.1  | 0.2  | 0.3  | 0.3  | 0.2  |     | 0.1  | 0.2  | 0.3  |

The real number in each cell in Table 3 is 1−ln (DIST12) wherein DIST12 is a Euclidean distance between the respective semantic metadata in the column of System A and the column of System B determined by the columns in Table 3 that intersect at the cell. For example, the real number 0.7 in Table 3 is 1−ln(P) wherein P is the Euclidean distance between the semantic metadata in the column name of column A2_2 and the semantic metadata in the column name of column B1_2. The matrix in Table 3 depicts a calculation of X=1−ln (DIST12) for all cells in the matrix (i.e., between each pair of a column in data system A and a column in data system B).

The calculation of Euclidian distance DIST12 uses semantic metadata in the semantic dataset, as illustrated in the example of Table 4 which is Table 2 with added coordinate information (x1, x2, . . . , y1, y2, . . . , z4, z5).

TABLE 4

Notation pertaining to computation of Euclidean distance

| Semantic Data ↓/Keywords → | User   | Gender | Client | Age    | Name   |
|----------------------------|--------|--------|--------|--------|--------|
| S_111                      | 1 (x1) | 0 (x2) | 0 (x3) | 0 (x4) | 1 (x5) |
| S_243                      | 0 (y1) | 0 (y2) | 1 (y3) | 0 (y4) | 1 (y5) |
| S_325                      | 0 (z1) | 1 (z2) | 0 (z3) | 0 (z4) | 0 (z5) |

The general formula for calculating Euclidian distance (DIST12) from the semantic dataset, using the coordinate notation in Table 4, is as follows.

$$\text{DIST12} = [(x1-y1)^2 + (y1-y2)^2 + (xn-yn)^2]^{1/2} \quad (1)$$

In Equation (1), n denotes the number of keywords in the header row of the semantic dataset.

Using Equation (1) for S_111-S_243, $$X = 1 - \ln([(1-0)^2 + (0-0)^2 + (0-1)^2 + (0-0)^2 + (1-1)^2]^{1/2}) = 1 - 0.34 = 0.66$$

Using Equation (1) for S_111-S_325, $$X = 1 - \ln([(1-0)^2 + (0-1)^2 + (0-0)^2 + (0-0)^2 + (1-0)^2]^{1/2}) = 1 - 0.54 = 0.46$$

Using Equation (1) for S_243-S_325, $$X = 1 - \ln([(0-0)^2 + (0-1)^2 + (1-0)^2 + (0-0)^2 + (1-0)^2]^{1/2}) = 1 - 0.54 = 0.46$$

Figure 4:
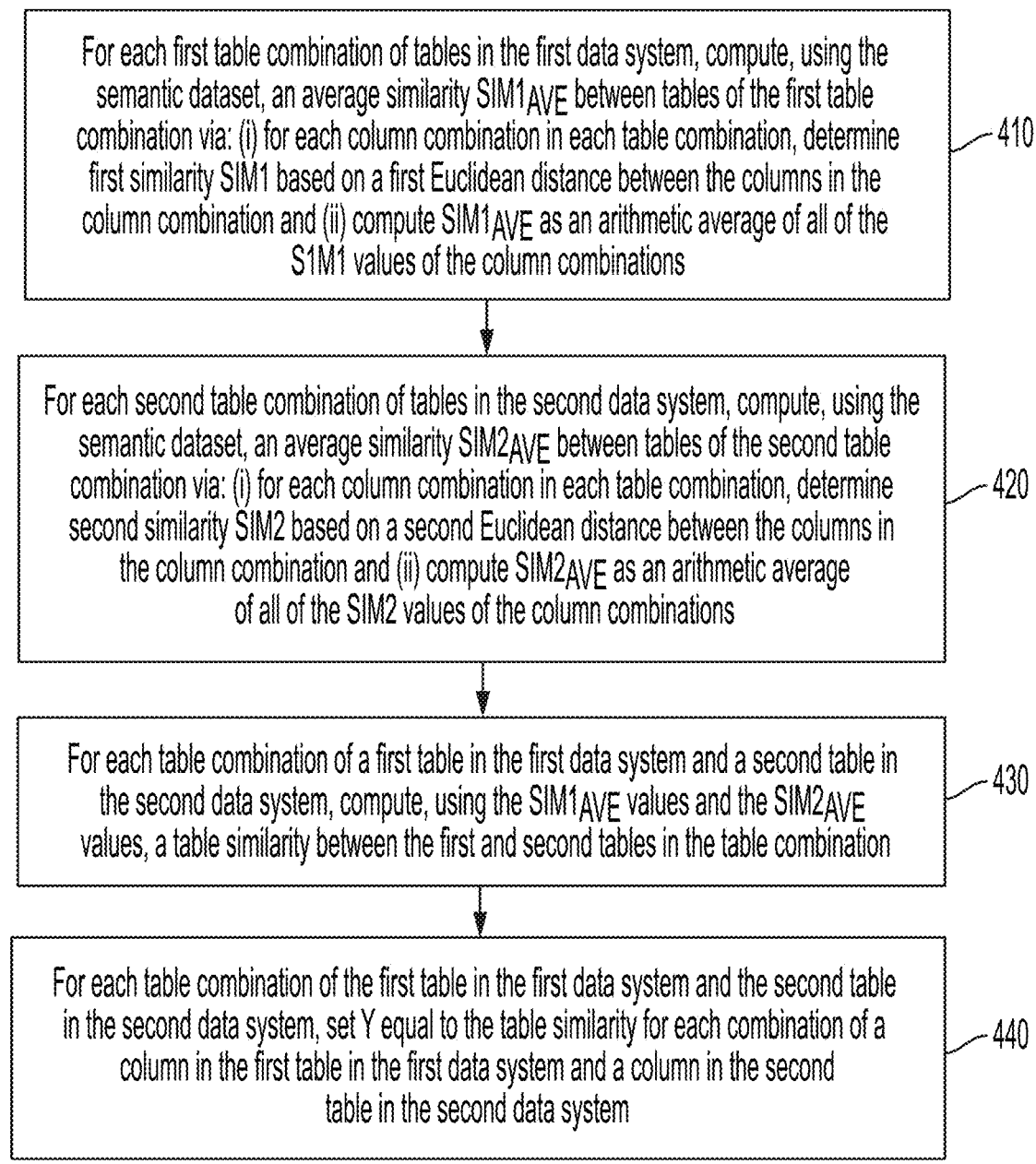
FIG. 4 is a flow chart describing a process, using the semantic dataset, for computing a second measure (Y) of similarity between columns of tables in the first data system and columns of tables in the second data system, in accordance with embodiments of the present invention.

FIG. 4 is a flow chart describing a process, using the semantic dataset, for computing a second measure (Y) of similarity between columns of tables in a first data system A and columns of tables in a second data system B, in accordance with embodiments of the present invention. The process described in FIG. 4 implements step 230 of FIG. 2 and comprises steps 410-440.

For each first table combination of tables in the first data system A, step 410 computes, using the semantic dataset, an average similarity $\text{SIM1}_{AVE}$ between tables of the first table combination via: (i) for each column combination in each first table combination, determining a first similarity SIM1 based on a first Euclidean distance DIST1 between the columns in the column combination and (ii) computing $\text{SIM1}_{AVE}$ as an arithmetic average of all of the values of the column combinations. SIM1 is computed as being equal to 1−ln (DIST1) if DIST1>0 and being equal to a specified real number R1 greater than 1 if DIST1=0.

For each second table combination of tables in the second data system B, step 420 computes, using the semantic dataset, an average similarity $\text{SIM2}_{AVE}$ between tables of the second table combination via: (i) for each column combination in each second table combination, determining a second similarity SIM2 based on a second Euclidean distance DIST2 between the columns in the column combination and (ii) computing $\text{SIM2}_{AVE}$ as an arithmetic average of all of the values of the column combinations. SIM2 is computed as being equal to 1−ln (DIST2) if DIST2>0 and being equal to a specified real number R2 greater than 1 if DIST2=0.

For each table combination of a first table in the first data system A and a second table in the second data system B, step 430 computes, using the $\text{SIM1}_{AVE}$ values and the $\text{SIM2}_{AVE}$ values, a table similarity between the first table and the second table in the table combination. In one embodiment, the table similarity is a cosine similarity between the first table and the second table in the table combination.

For each table combination of the first table in the first data system A and the second table in the second data system B, step 440 sets Y equal to the table similarity for each combination of a column in the first table in the first data system A and a column in the second table in the second data system B.

The following example illustrates the process of FIG. 4.

Table 5 depicts the first similarity SIM1 between columns of tables A1 and A2 within data system A. For example, SIM1 between A2_1 (column 1 in table 2 of first data system A) and A1_3 (column 3 in table 1 of first data system A) is 0.4.

TABLE 5

| First similarity SIM1 between columns of tables A1 and A2 | | | |
|---|---|---|---|
| | A1_1 | A1_2 | A1_3 |
| A2_1 | 0.2 | 0.3 | 0.4 |
| A2_2 | 0.2 | 0.1 | 0.1 |
| A2_3 | 0.3 | 0.2 | 0.1 |

Table 6 depicts an average similarity $SIM1_{AVE}$ between tables Ai (i=1, 2, . . . ) of data system A. $SIM1_{AVE}$ is computed in accordance with step 410 of FIG. 4.

TABLE 6

| $SIM1_{AVE}$ between tables of data system A | | | | | | |
|---|---|---|---|---|---|---|
| | A1 | A2 | A3 | A4 | A5 | A6 |
| A1 | 1 | 0.21 | 0.3 | 0.6 | 0.3 | 0.6 |
| A2 | 0.21 | 1 | 0.6 | 0.8 | 0.6 | 0.8 |
| A3 | 0.3 | 0.6 | 1 | 0.6 | 0.3 | 0.6 |
| A4 | 0.6 | 0.8 | 0.6 | 1 | 0.2 | 0.4 |
| A5 | 0.3 | 0.6 | 0.3 | 0.2 | 1 | 0.3 |
| A6 | 0.6 | 0.8 | 0.6 | 0.4 | 0.3 | 1 |

Illustratively in Table 6, an average similarity $SIM1_{AVE}$ between table A1 and table A2 in data system is 0.21 which is computed from Table 5 as follows.

$SIM1_{AVE}=(0.2+0.3+0.4+0.2+0.1+0.1+0.3+0.2+0.1)/9=0.21$

The data content in Table 6 may be expressed as a relationship graph of nodes and edges between nodes.

Figure 5A:
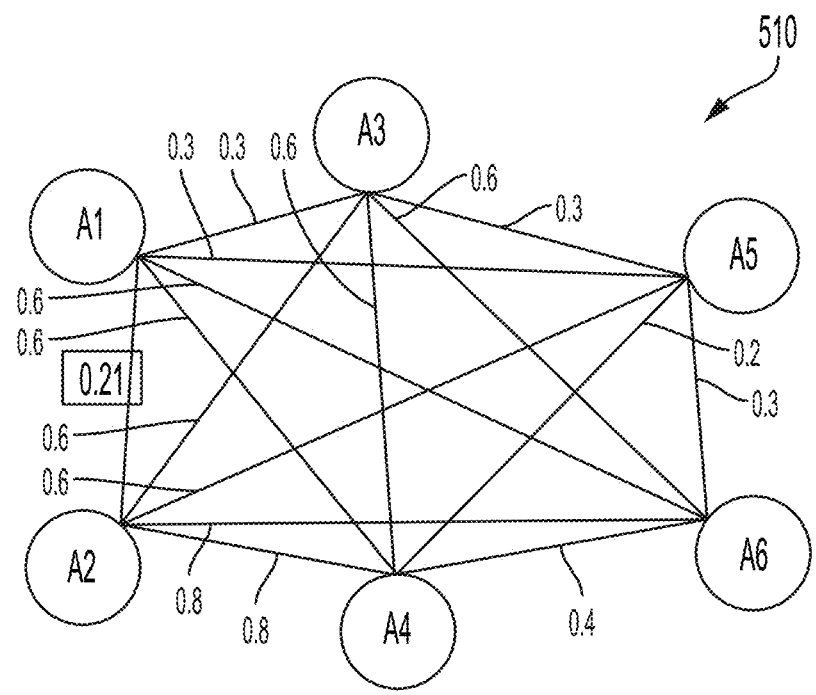
FIG. 5A is a relationship graph depicting an average similarity between tables of the first data system, in accordance with embodiments of the present invention.

FIG. 5A is a relationship graph 510 depicting an average similarity between tables of the first data system A, in accordance with embodiments of the present invention. The relationship graph in FIG. 5A is a graphical representation of Table 6 in which the tables A1, A2, A3, A4, A5 and A6 are nodes, and the edges between the nodes have an edge value equal to the average similarity $SIM1_{AVE}$ in the cells of Table 6.

Table 7 depicts the second similarity SIM2 between columns of tables B1 and B2 within data system B. For example, SIM2 between B2_3 (column 3 in table 2 of second data system B) and B1_2 (column 2 in table 1 of second data system B) is 0.6.

TABLE 7

| Second similarity SIM2 between columns of tables B1 and B2 | | | |
|---|---|---|---|
| | B1_1 | B1_2 | B1_3 |
| B2_1 | 0.6 | 0.7 | 0.7 |
| B2_2 | 0.5 | 0.6 | 0.6 |
| B2_3 | 0.5 | 0.6 | 0.6 |

Table 8 depicts an average similarity $SIM2_{AVE}$ between tables Bj (j=1, 2, . . . ) of data system B. $SIM2_{AVE}$ is computed in accordance with step 420 of FIG. 4.

TABLE 8

| $SIM2_{AVE}$ between tables of data system B | | | | | |
|---|---|---|---|---|---|
| | B1 | B2 | B3 | B4 | B5 |
| B1 | 1 | 0.6 | 0.8 | 0.6 | 0.8 |
| B2 | 0.6 | 1 | 0.6 | 0.3 | 0.6 |
| B3 | 0.8 | 0.6 | 1 | 0.2 | 0.4 |
| B4 | 0.6 | 0.3 | 0.2 | 1 | 0.8 |
| B5 | 0.8 | 0.6 | 0.4 | 0.8 | 1 |

Illustratively in Table 8, an average similarity $SIM2_{AVE}$ between table B1 and table B2 in data system is 0.60 which is computed from Table 7 as follows $SIM2_{AVE}=(0.6+0.7+0.7+0.5+0.6+0.6+0.5+0.6+0.6)/9=0.60$ The data content in Table 8 may be expressed as a relationship graph of nodes and edges between nodes.

Figure 5B:
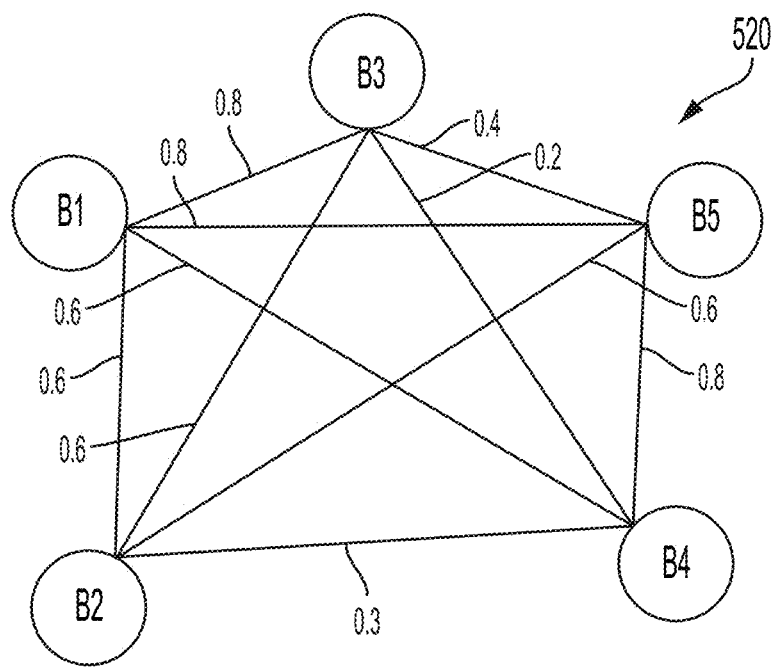
FIG. 5B is a relationship graph depicting an average similarity between tables of the second data system, in accordance with embodiments of the present invention.

FIG. 5B is a relationship graph 520 depicting an average similarity between tables of the second data system B, in accordance with embodiments of the present invention. The relationship graph in FIG. 5B is a graphical representation of Table 8 in which the tables B1, B2, B3, B4 and B5 are nodes, and the edges between the nodes have an edge value equal to the average similarity $SIM2_{AVE}$ in the cells of Table 8.

For each combination of a first table in the first data system A and a second table in the second data system B, respectively, step 430 computes, using the $SIM1_{AVE}$ values (from Table 6 or FIG. 5A) and the $SIM2_{AVE}$ values (from Table 8 or FIG. 5B), a table similarity between the first table in the first data system A and the second table in the second data system B. In one embodiment, the table similarity between Table Ai and Table Bj is a cosine similarity (COS_SIM) implemented according to Equation 2.

$$COS\_SIM(Ai, Bj) = \frac{\sum_{k}^{n} AiAk * \sum_{l}^{m} BjBl}{\sqrt{\sum_{k}^{n} AiAk^2} * \sqrt{\sum_{l}^{m} BjBl^2}} \quad (2)$$

For example, $$COS\_SIM(A1, B2) = \frac{(A1A2 + A1A3 + A1A4 + A1A5 + A1A6) * (B2B1 + B2B3 + B2B4 + B2B5)}{\sqrt{A1A2^2 + A1A3^2 + A1A4^2 + A1A5^2 + A1A6^2} * \sqrt{B20.6B1^2 + B2B3^2 + B2B4^2 + B2B5^2}}$$

$$= \frac{(0.21 + 0.3 + 0.6 + 0.3 + 0.6) * (0.6 + 0.6 + 0.3 + 0.6)}{\sqrt{0.21^2 + 0.3^2 + 0.6^2 + 0.3^2 + 0.6^2} * \sqrt{0.6^2 + 0.6^2 + 0.3^2 + 0.6^2}}$$

$$= \frac{4.11}{1.05}$$

$$= 3.91$$

Table 9 depicts COS_SIM (Ai, Bj) showing COS_SIM (A1, B2)=3.91.

TABLE 9

Cosine similarity between table Ai and table Bj

|    | A1   | A2  | A3  | A4  | A5  | A6  |
|----|------|-----|-----|-----|-----|-----|
| B1 | 0.2  | 0.7 | 0.7 | 0.4 | 0.2 | 0.5 |
| B2 | 3.91 | 0.4 | 0.2 | 0.3 | 0.5 | 0.4 |
| B3 | 0.4  | 0.3 | 0.2 | 0.2 | 0.7 | 0.3 |
| B4 | 0.5  | 0.7 | 0.5 | 0.4 | 0.5 | 0.5 |
| B5 | 0.8  | 0.6 | 0.3 | 0.3 | 0.5 | 0.3 |

The cosine similarity in Table 9 is an embodiment of the table similarity computed in accordance with step 430 of FIG. 4.

For each table combination of the first table Ai and the second table Bj in Table 9, Table 10 shows the similarity Y being set to the table similarity (i.e., the cosine similarity in Table 9) for each combination of a column in the first table Ai in the first data system A and a column in the second table Bj in the second data system B, in accordance with step 440 of FIG. 4.

For example, the previously computed value of 3.91 for COS_SIM (A1, B2) is set for each combination of a column in Table A1 and a column in Table B2.

TABLE 10

System A and System B: Cosine similarity between table columns

|      | A1_1 | A1_2 | A1_3 | A2_1 | A2_2 | A2_3 | ... | A6_1 | A6_2 | A6_3 |
|------|------|------|------|------|------|------|-----|------|------|------|
| B1_1 | 0.2  | 0.2  | 0.2  | 0.7  | 0.7  | 0.7  |     | 0.5  | 0.5  | 0.5  |
| B1_2 | 0.2  | 0.2  | 0.2  | 0.7  | 0.7  | 0.7  |     | 0.5  | 0.5  | 0.5  |
| B1_3 | 0.2  | 0.2  | 0.2  | 0.7  | 0.7  | 0.7  |     | 0.5  | 0.5  | 0.5  |
| B2_1 | 3.91 | 3.91 | 3.91 | 0.4  | 0.4  | 0.4  |     | 0.4  | 0.4  | 0.4  |
| B2_2 | 3.91 | 3.91 | 3.91 | 0.4  | 0.4  | 0.4  |     | 0.4  | 0.4  | 0.4  |
| B2_3 | 3.91 | 3.91 | 3.91 | 0.4  | 0.4  | 0.4  |     | 0.4  | 0.4  | 0.4  |
| ...  |      |      |      |      |      |      |     |      |      |      |
| B5_1 | 0.8  | 0.8  | 0.8  | 0.6  | 0.6  | 0.6  |     | 0.3  | 0.3  | 0.3  |
| B5_2 | 0.8  | 0.8  | 0.8  | 0.6  | 0.6  | 0.6  |     | 0.3  | 0.3  | 0.3  |
| B5_3 | 0.8  | 0.8  | 0.8  | 0.6  | 0.6  | 0.6  |     | 0.3  | 0.3  | 0.3  |

Figure 6:
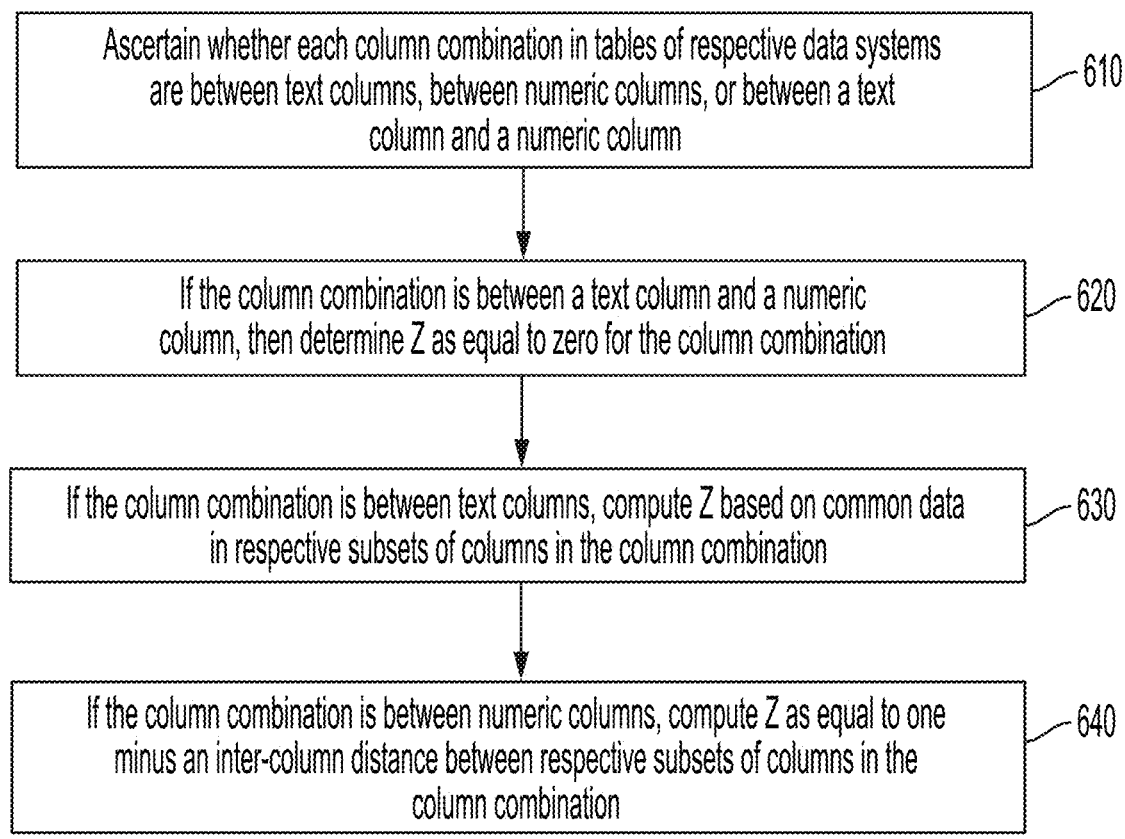
FIG. 6 is a flow chart describing a process for computing a third measure (Z) of similarity between columns in column combinations of columns of tables in the first data system and columns of tables in the second data system, in accordance with embodiments of the present invention.

FIG. 6 is a flow chart describing a process for computing a third measure (Z) of similarity between columns in column combinations of columns of tables in the first data system A and columns of tables in the second data system B, in accordance with embodiments of the present invention. The process described in FIG. 6 implements step 240 of FIG. 2 and comprises steps 610-640

Step 610 ascertains whether each column combination in tables of respective data systems are between text columns, between numeric columns, or between a text column and a numeric column.

If step 620, determines that the column combination is between a text column and a numeric column, then step 620 determines Z as equal to zero for the column combination.

If step 630, determines that the column combination is between text columns, then step 630 computes Z based on common data in respective subsets of columns in the column combination.

If step 640, determines that the column combination is between numeric columns, then step 640 computes Z as equal to one minus an inter-column distance between respective subsets of columns in the column combination.

Figure 7:
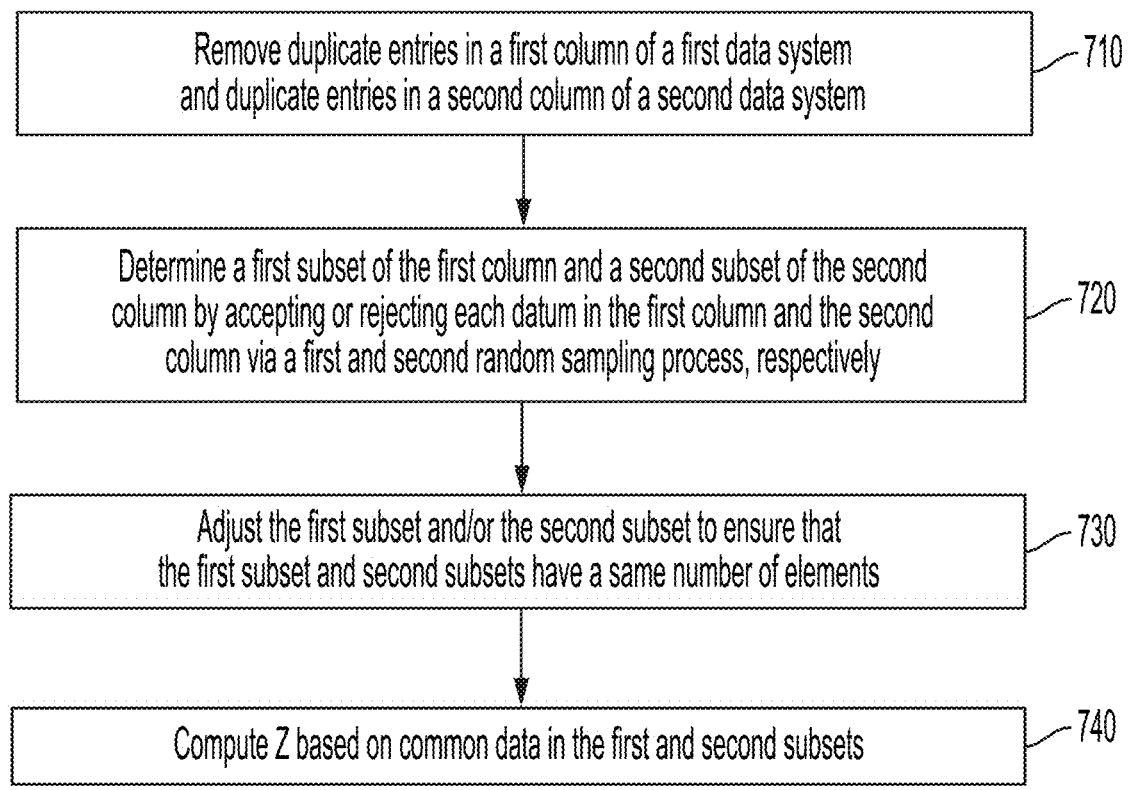
FIG. 7 is a flow chart describing a process for computing the third measure of similarity Z if the column combinations are between text columns, in accordance with embodiments of the present invention.

FIG. 7 is a flow chart describing a process for computing the third measure of similarity Z if the column combinations are between text columns, in accordance with embodiments of the present invention. The process described in FIG. 7 implements step 630 of FIG. 6 and comprises steps 710-740.

Step 710 removes duplicate entries in a first column of a first data system and duplicate entries in a second column of a second data system.

Step 720 determines a first subset of the first column and a second subset of the second column by accepting or rejecting each datum in the first column and the second columns via a first and second random sampling process, respectively Step 730 adjusts the first subset and/or the second subset to ensure that the first subset and second subsets have a same number of elements Step 740 computes Z based on common data in the first and second subsets.

The column combination is a first column of text data in a first table in a first data system and a second column of text data in a second table in a second data system, as illustrated by an example in Tables 11 and 12.

TABLE 11

First text columns

| Row Number | First Column |
|------------|--------------|
| 1          | New York City |
| 2          | Los Angeles |
| 3          | Chicago |
| 4          | Houston |
| 5          | Phoenix |
| 6          | Philadelphia |
| 7          | San Antonio |
| 8          | San Diego |
| 9          | Dallas |
| 10         | Austin |
| 11         | Seattle |
| 12         | Denver |
| 13         | Boston |
| 14         | Atlanta |
| 15         | Houston |

TABLE 12

Second text column

| Row Number | Second Column |
|------------|---------------|
| 1          | Chicago |
| 2          | Columbus |
| 3          | San Antonio |
| 4          | Sacramento |
| 5          | Dallas |
| 6          | San Francisco |
| 7          | Los Angeles |
| 8          | Miami |
| 9          | Houston |
| 10         | Seattle |
| 11         | Boston |
| 12         | Fort Forth |
| 13         | Cleveland |

Step 710 removes duplicate entries in the first column in Table 11. In Table 11, the first column has a duplicate entry of Houston in row 15. Thus, step 710 removes Houston in row 15 from the first column. The are no duplicate entries in the second column in Table 12.

Step 720 determines a first subset of the first column and a second subset of the second column by accepting or rejecting each datum in the first column and the second column, respectively, via random sampling using a step function probability density function (PDF).

The PDF, denoted as f(x), is defined over 0≤x≤1 as follows.

$$f(x)=1/\lambda \text{ for } 0 \leq x \leq \lambda \text{ and } f(x)=0 \text{ for } \lambda < x \leq 1 \qquad (3)$$

The parameter $\lambda$ is a specified constant subject to $0<\lambda<1$.

In one embodiment, the constant X may be specified via user input.

The preceding PDF f(x) described in Equation (3) is normalized in accordance with $\int_0^1 f(x)=1$.

Figure 8:
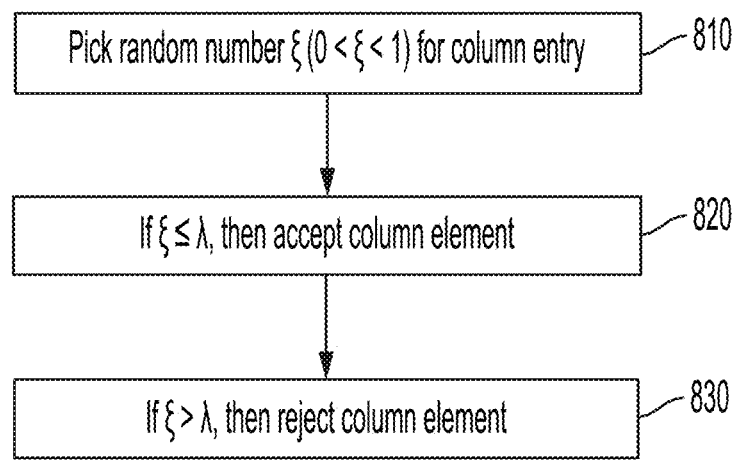
FIG. 8 is a flow chart describing a process for computing the third measure of similarity Z if the column combinations are between numeric columns, in accordance with embodiments of the present invention.

FIG. 8 is a flow chart for accepting or rejecting each column element in the first column and the second column using the step-function PDF f(x) described in Equation (3), in accordance with embodiments of the present invention. The process described in FIG. 8 comprises steps 810-830.

Step 810 picks a random number ξ in a range of 0 to 1.

If ξ≤λ, then step 820 accepts the column element.

If ξ>λ, then step 820 rejects the column element.

The case of λ=0.50 represents coin-flip random sampling.

In one embodiment, λ has a same numerical value for the first column and the second column.

In one embodiment, λ has a different numerical value for the first column and the second column.

The constant λ is an approximate fraction of the elements in the column that are accepted by the preceding random sampling process. For example, if a column has 100 elements and λ=0.50, then approximately 50 elements (0.50*100) of the 100 column elements will be accepted by the preceding random sampling process. As another example, if a column has 100 elements and λ=0.70, then approximately 70 elements (0.70*100) of the 100 column elements will be accepted by the preceding random sampling process.

Application of the preceding random sampling process to the example of Tables 11 and 12 with λ=0.60 for the first column in Table 11 and λ=0.70 for the second column in Table 12, may result illustratively in the accepted elements shown in Tables 13 and 14 for the first and second subset of the first and second column, respectively.

TABLE 13

First subset of text columns

| Row Number | First Subset of First Column |
|---|---|
| 1 | New York City |
| 2 | Los Angeles |
| 3 | Chicago |
| 4 | Houston |
| 5 | San Antonio |
| 6 | Dallas |
| 7 | Seattle |
| 8 | Boston |
| 9 | Atlanta |

TABLE 14

Second subset of text column

| Row Number | Second Subset of Second Column |
|---|---|
| 1 | Chicago |
| 2 | San Antonio |
| 3 | Dallas |
| 4 | San Francisco |
| 5 | Los Angeles |
| 6 | Miami |
| 7 | Houston |
| 8 | Seattle |

Returning to FIG. 7, step 730 adjusts the first subset and/or the second subset to ensure that the first subset and the second subsets have a same number of elements. In this regard, it is noted that λ can be configured to have approximately the same number of accepted elements in the first column and the second column in instances in which the first and second columns have a different number of elements, via the following relationship.

$$\lambda 1 * N1 = \lambda 2 * N2 \qquad (4)$$

In Equation (4), N1 and N2 denote the number of elements, and λ1 and λ2 denote λ, for the first column and the second column, respectively. For example, if the first column has 120 elements (N1=120), the second column has 150 elements (N2=150), and λ1=0.50, then λ2 can be chosen as 0.40 (λ1*N1/N2=0.50*120/150), resulting in approximately 50 elements being accepted for both the first column and the second column via the preceding random sampling process.

Figure 11:
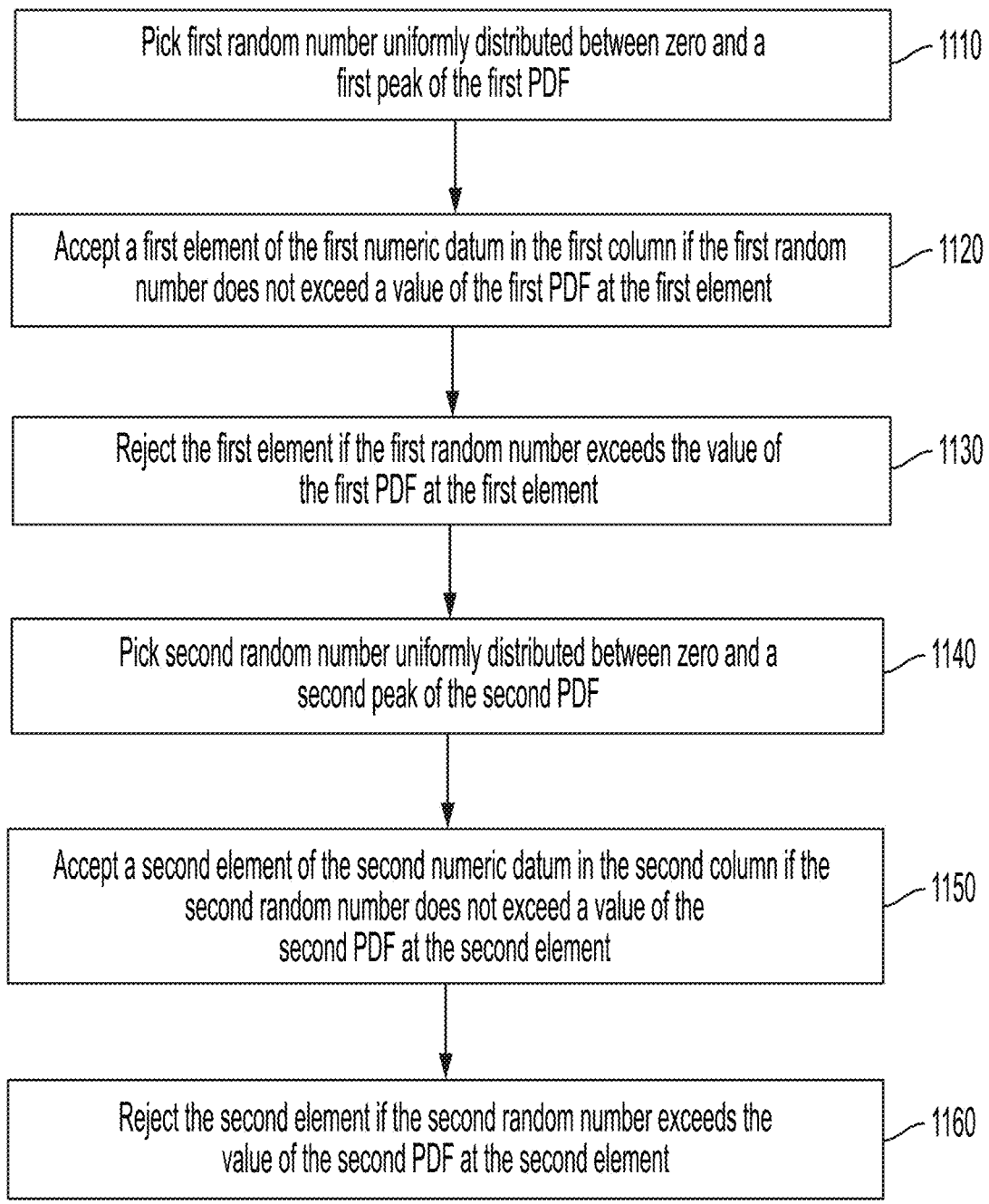
FIG. 11 is a flow chart applying the use of rejection sampling illustrated in FIG. 10, in accordance with embodiments of the present invention
Figure 12:
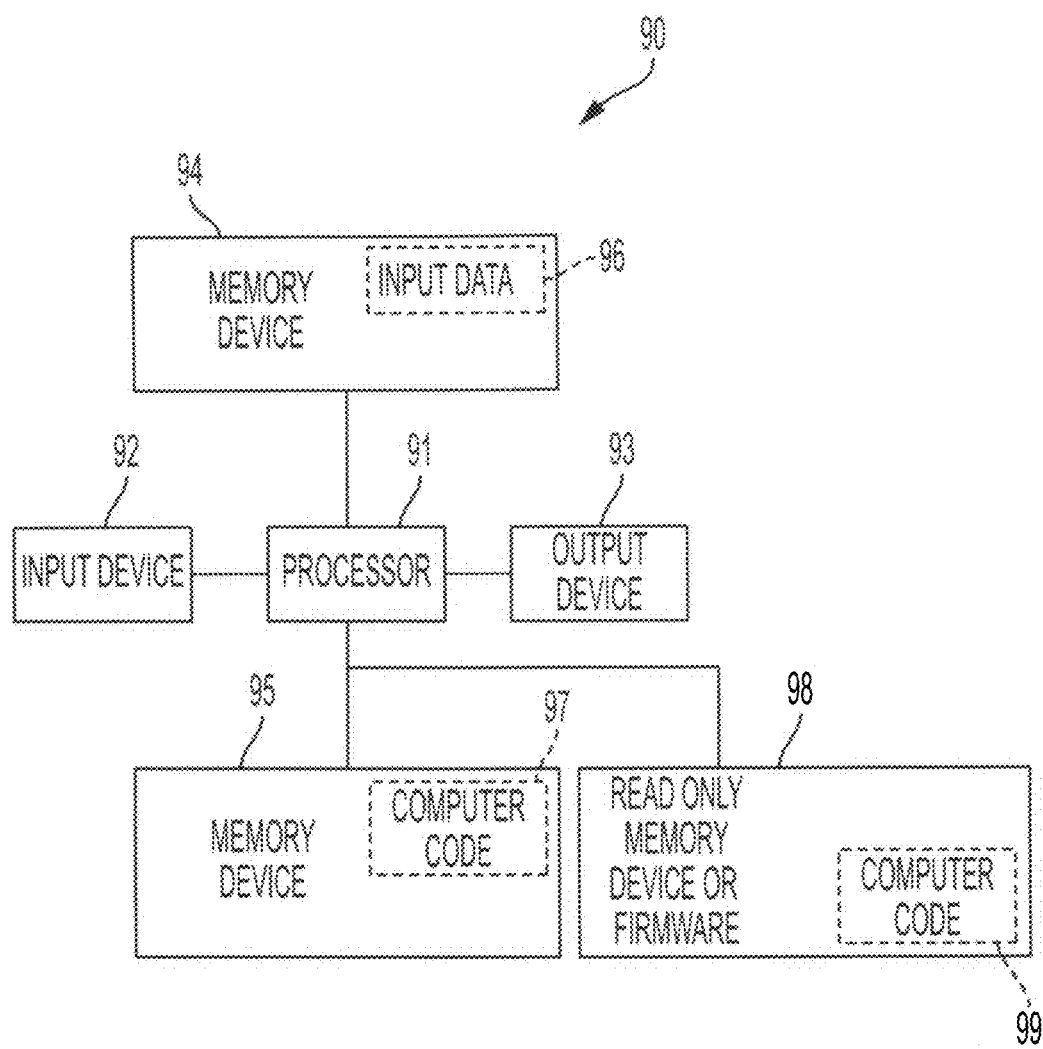
FIG. 12 illustrates a computer system, in accordance with embodiments of the present invention.

For the preceding random sampling process applied to the first and second columns in FIGS. 11 and 12, N1=15, λ1=0.60, N2=13, and λ2=0.69, Equation (2) is approximately satisfied, because λ1*N1=λ1*N2=9. In Tables 13 and 14, the resulting first and second subset of the first and second column has subset has 9 elements and 8 elements, respectively, showing that Equation (4) was advantageously utilized.

Nonetheless, the number of elements (9) in the first subset in Table 13 differs from the number of elements (8) in the second subset in Table 14, so that an other random sampling process, using the PDF in Equation (2), is next applied to equalize the number of elements in the first and second subsets, wherein either a previously used value of λ, or a new value of λ, may be used.

In a first embodiment, the other random sampling process may comprise randomly rejecting one or more previously accepted elements from the column having the most accepted elements, using the PDF of Equation (3), in order to equalize the number of accepted elements between the first and second subsets. For Tables 13 and 14, this embodiment randomly rejects one element from the 9 previously accepted elements (New York City, Los Angeles, Chicago, Houston, San Antonio, Dallas, Seattle, Boston, Atlanta) from the first column shown in Table 13, using the PDF of Equation (3), illustratively rejecting Atlanta resulting in the first and second subsets each having 8 accepted elements.

In a second embodiment, the other random sampling process may comprise randomly accepting one or more previously rejected elements from the column having the least accepted elements, using the PDF of Equation (2), in order to equalize the number of accepted elements between the first and second subsets. For Tables 13 and 14, this embodiment randomly accepts one element from the 5 previously rejected elements (Columbus, Sacramento, Boston, Fort Worth, Cleveland) from the second column shown in Table 14, using the PDF of Equation (3), illustratively accepting Sacramento resulting in the first and second subsets each having 9 accepted elements.

Step 740 computes Z based on common data in the first and second subsets, namely:

$$Z = NC/NT \qquad (5)$$

In Equation (5), NC denotes the number of common elements between the first subset and the second subset, and NT denotes the total number of elements in each subset of the first subset and the second subset.

In the preceding first embodiment, NC=6 (Los Angeles, Chicago, Houston, San Antonio, Dallas, Seattle), NT=8, and D=6/8=0.75.

In the preceding second embodiment, NC=6 (Los Angeles, Chicago, Houston, San Antonio, Dallas, Seattle), NT=9, and D=6/9=0.67.

Figure 9:
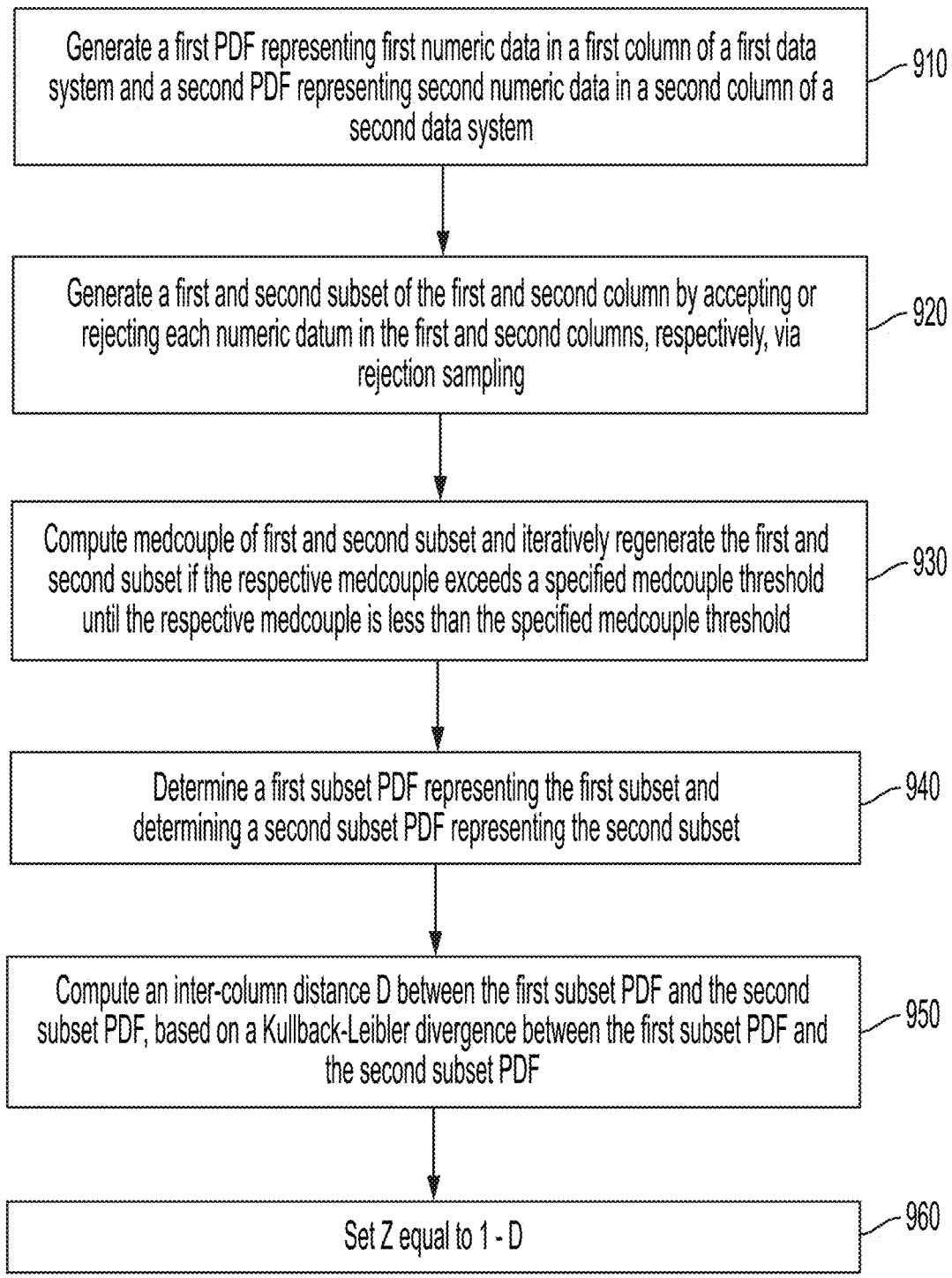
FIG. 9 is a flow chart describing a process, using rejection sampling, for computing the third measure of similarity Z if the column combinations are between numeric columns, in accordance with embodiments of the present invention.

FIG. 9 is a flow chart describing a process, using rejection sampling, for computing the third measure of similarity Z if the column combinations are between numeric columns, in accordance with embodiments of the present invention. The process described in FIG. 9 implements step 640 of FIG. 6 and comprises steps 910-960.

A column combination in FIG. 9 is a first column of numeric data in a first table in a first data system and a second column of numeric data in a second table in a second data system, as illustrated by an example in Tables 15 and 16, respectively.

TABLE 15

First numeric column

| Row Number | First Column |
|---|---|
| 1 | 34 |
| 2 | 28 |
| 3 | 31 |
| 4 | 26 |
| 5 | 35 |
| 6 | 29 |
| 7 | 31 |
| 8 | 37 |
| 9 | 26 |
| 10 | 29 |
| 11 | 30 |
| 12 | 31 |
| 13 | 38 |
| 14 | 33 |

TABLE 16

Second numeric column

| Row Number | Second Column |
|---|---|
| 1 | 29 |
| 2 | 42 |
| 3 | 30 |
| 4 | 28 |
| 5 | 31 |
| 6 | 33 |
| 7 | 36 |
| 8 | 28 |
| 9 | 26 |
| 10 | 29 |
| 11 | 32 |
| 12 | 26 |
| 13 | 29 |

Step 910 determines a first PDF (PDF1) representing the first column of a first table in a first data system and a second PDF (PDF2) representing a second column of a second table in a second data system. PDF1 and PDF2 each have a functional dependence f(x) in terms of the numerical values x in the first column and the second column In one embodiment, the functional dependence f(x) of PDF1 and/or PDF2 is a normal distribution characterized by parameters of a mean $\mu$ and a standard deviation $\sigma$, wherein the normal distribution representation of f(x) is given by:

$$f(x) = \frac{1}{\sigma\sqrt{2\pi}} e^{-\frac{(x-\mu)^2}{2\sigma^2}} \qquad (6)$$

For the first column of Table 15, $\mu=31.29$ and $\sigma=3.59$.

For the second column of Table 16, $\mu=30.69$ and $\sigma=4.21$.

Use of the normal distribution is illustrative, and the first PDF and/or second PDF may have a functional form other than a normal distribution characterized by parameters having numerical values derived from the numeric data in the first column and/or the second column analogous to determination of the mean and standard deviation for the first column and/or second column in Table 15 and/or Table 16, respectively.

Figure 10:
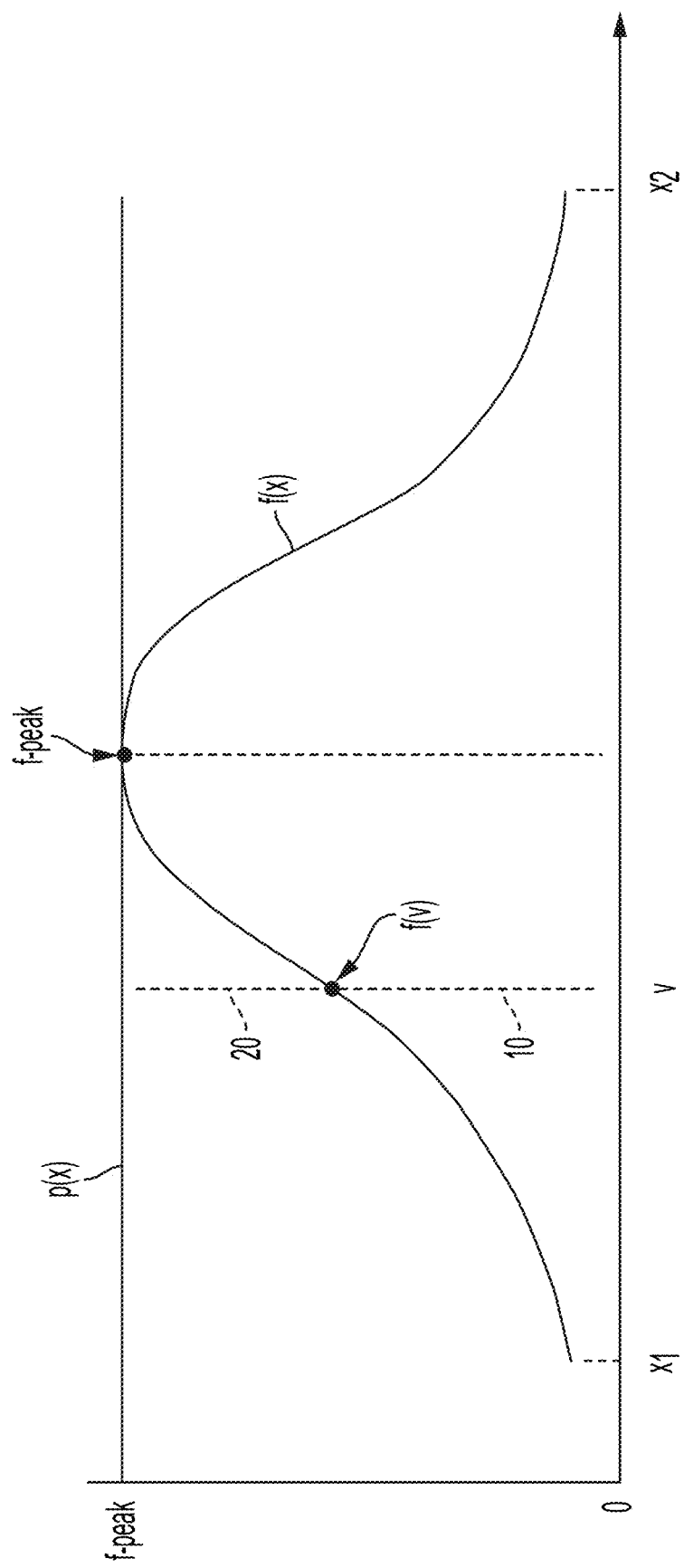
FIG. 10 illustrates use of rejection sampling, in accordance with embodiments of the present invention.

Step 920 generates a first subset of the first column by accepting or rejecting each datum in the first via rejection sampling using the first PDF (PDF1). Step 920 also generates a second subset of the second column by accepting or rejecting each datum in the second column via rejection sampling using the second PDF (PDF2), FIG. 10 illustrates use of rejection sampling, in accordance with embodiments of the present invention. In FIG. 10, f(x) denotes the PDF (PDF1 or PDF2), p(x) denotes a proposal distribution, x1 and x2 denote a minimum and maximum numerical value in the column, and f-peak denotes a peak value of the PDF f(x). The proposal distribution is a uniformly distributed between 0 and f-peak. For the first column of Table 15, x1=26 and x2=38. For the second column of Table 16, x1=26 and x2=42.

In one embodiment, the PDF f(x) can be normalized such that f-peak=1. For example, the normal distribution could be normalized to be $$f(x) = e^{-\frac{(x-\mu)^2}{2\sigma^2}}$$

characterized by f-peak=1 at x=$\mu$.

Noting that each column element has a numerical value v, a random number $\xi$ (0<$\xi$<f-peak) is picked from the proposal distribution p(x) for element whose numerical value is v.

If $\xi \leq$ p(v) corresponding to domain 10 between 0 and f(v) in FIG. 10, then the column element whose numerical value is v is accepted.

If $\xi >$ p(v) corresponding to domain 20 between f(v) and f-peak in FIG. 10, then the column element whose numerical value is v is rejected.

FIG. 11 is a flow chart applying the use of rejection sampling illustrated in FIG. 10, in accordance with embodiments of the present invention. The process described in FIG. 11 comprises steps 1110-1160. In steps 1110-1130, the rejection sampling pertains to each first element of the first numeric data in the first column. In steps 1140-1160, the rejection sampling pertains to each second element of the second numeric data in the second column.

Step 1110 picks first random number uniformly distributed between zero and a first peak of the first PDF.

Step 1120 accepts a first element of the first numeric datum in the first column if the first random number does not exceed a value of the first PDF at the first element.

Step 1130 rejects the first element if the first random number exceeds the value of the first PDF at the first element.

Step 1140 picks second random number uniformly distributed between zero and a second peak of the second PDF Step 1150 accepts a second element of the second numeric datum in the second column if the second random number does not exceed a value of the second PDF at the second element.

Step 1160 rejects the second element if the second random number exceeds the value of the second PDF at the second element.

By performing the process of FIG. 11, in conjunction with FIG. 10, for each element of the first column and the second column, the first subset of the first column and the second subset of the second column are generated, respectively, in step 920 of FIG. 9.

Application of the preceding rejection sampling process to the example of Tables 15 and 16 may result illustratively in the accepted elements shown in Tables 17 and 18 for the first and second subset of the first and second column, respectively.

TABLE 17

First Numeric Columns

| Row Number | First Subset of First Column |
|---|---|
| 1 | 34 |
| 2 | 31 |
| 3 | 26 |
| 4 | 29 |
| 5 | 29 |
| 6 | 38 |
| 7 | 31 |
| 8 | 30 |

TABLE 18

Second Numeric Column

| Row Number | Second Subset of Second Column |
|---|---|
| 1 | 29 |
| 2 | 30 |
| 3 | 28 |
| 4 | 33 |
| 5 | 28 |
| 6 | 26 |
| 7 | 29 |
| 8 | 32 |

Returning to FIG. 9, step 930 computes a first medcouple (MC1) for the first subset of the first column and a second medcouple (MC2) for the second subset of the second column.

The medcouple (MC) of a distribution is a number whose absolute value measures the extent to which a distribution is skewed, and MC=0 corresponds to the distribution not being skewed. MC>0 indicates that the distribution is skewed to the right, and MC<0 indicates that the distribution is skewed to the left. Step 930 is configured to ensure that the first and second subsets are not overly skewed by satisfying MC1≤MCt and MC2≤MCt wherein MCt is a specified medcouple threshold. The medcouple threshold MCt is a specified positive real number (e.g., 0.10, 0.25, 0 0.40, 0.60, etc.).

A medcouple (MC) for a distribution represented as a column X having elements $X_1, X_2 \ldots X_n$ is computed as a median of a kernel function $H(X_i, X_j)$ in terms of the median Xmed of the column X, wherein $H(X_i, X_j)$ is computed as follows.

$$H(X_i, H_j) = \frac{(Xj - Xmed) - (Xmed - Xi)}{Xj - Xi} \text{ if } Xi < Xmed < Xj \quad (7)$$

$$H(Xi,Xj) = \text{sgn}(p-1-i-j) \text{ if } Xi = Xmed = Xj \quad (8)$$

$$p = \text{set of } Xi \leq Xmed \quad (9)$$

$$\text{sgn}(x) = -1, 0, +1 \text{ if } x<0, x=0, x>0, \text{ respectively} \quad (10)$$

The preceding computation of $H(X_i, X_j)$ via Equation (7) pairs values $X_i$ less than Xmed with values Xj greater than Xmed.

The medcouple computed in accordance with Equations (7)-(10) is between −1 and +1.

Next, the absolute value (ABS) of the first medcouple MC1 (i.e., ABS(MC1)) is compared with the medcouple threshold MCt and the absolute value of the second medcouple (i.e., ABS(MC2)) is compared with the medcouple threshold MCt, to determine whether the first subset and the second subset are overly skewed.

If the first medcouple MC1 is less than or equal to the medcouple threshold (i.e., MC1≤MCt), then the first subset is considered to not be overly skewed. Otherwise (i.e., MC1>MCt) which causes the first subset and the first medcouple MC1 to be iteratively recomputed as previously described until the first medcouple MC1 is less than or equal to the medcouple threshold (i.e., MC1≤MCt).

If the second medcouple MC2 is less than or equal to the medcouple threshold (i.e., MC2≤MCt), then the second subset is considered to not be overly skewed. Otherwise (i.e., MC2>MCt) which causes the second subset and the second medcouple MC2 to be iteratively recomputed as previously described until the second medcouple MC2 is less than or equal to the medcouple threshold (i.e., MC2≤MCt).

After the first subset and the second subset are each determined to not exceed the medcouple threshold, step 940 determines a first subset PDF (PDF11) representing the first subset and a second subset PDF (PDF22) representing the second subset, by using the process in step 910 of FIG. 9 to determine PDF11 and PDF22.

Specifically, PDF11 and PDF22 each have a functional dependence f(x) in terms of the numerical values x in the first subset and the second subset In one embodiment, the functional dependence f(x) of PDF11 and/or PDF22 is a normal distribution characterized by parameters of a mean p and a standard deviation a, wherein the normal distribution representation of f(x) is given by:

$$f(x) = \frac{1}{\sigma\sqrt{2\pi}} e^{-\frac{(x-\mu)^2}{2\sigma^2}} \quad (11)$$

For illustrative purposes, Tables 17 and 18 are assumed to be the first subset and the second subset respectively.

For the first column of Table 17, μ=31.00 and σ=3.39.

For the second column of Table 18, μ=29.38 and σ=2.12.

Use of the normal distribution is illustrative, and the first subset PDF and/or second subset PDF may have a functional form other than a normal distribution characterized by parameters having numerical values derived from the numeric data in the first column and/or the second column analogous to determination of the mean and standard deviation for the first column and/or second column in Table 17 and/or Table 18, respectively.

Step 950 computes an inter-column distance (D) between the first subset and the second subset, based on Kullback-Leibler divergence.

Generally, for discrete probability distributions P(x) (representing the first subset) and Q(x) (representing the second subset) for a columns X comprising a discrete sets of values x, the divergence of P from Q denoted as $D_{KL}(P\|Q)$, and the divergence of Q from P denoted as $D_{KL}(Q\|P)$, are in accordance with Equations (12) and (13).

$$D_{KL}(P\|Q)=\Sigma_{x\in X}P(x)\ln(P(x)/(Q(x))) \qquad (12)$$

$$D_{KL}(Q\|P)=\Sigma_{x\in X}Q(x)\ln(Q(x)/(P(x))) \qquad (13)$$

For instances in which P(x) is zero in Equation (12) and/or Q(x) is zero in Equation (13), the contribution of the corresponding term is taken as zero, because the limit of x ln(x) is zero as x approaches zero.

It is noted that $D_{KL}(P\|Q)$ and $D_{KL}(Q\|P)$ may have different numerical values.

In three different embodiments, the inter-column distance D is given by $D=D_{KL}(P\|Q)$, $D=D_{KL}(Q\|P)$, and D=½ (DKL $(P\|Q)+D_{KL}(Q\|P)$), respectively.

Step 960 sets Z equal to 1−D.

As stated supra, step 260 in FIG. 2 uses one or more computed parameters selected from the group consisting of X, Y, Z, U and combinations thereof to improve the computer system.

Accordingly, steps 250 and 260 in FIG. 2 collectively define practical applications for improving the computer system.

Step 250 computes a weighted combination (U) of X, Y and Z, namely a linear combination of X, Y and Z expressed as U(X,Y,Z)=aX+bY+cZ wherein a, b and c are real positive numbers. In one embodiment, a+b+c=1.

In one embodiment, the constants a, b and c are supplied via user input. In another embodiment, the constants a, b and c are encoded within program code of computer software used to implement embodiments of the present invention.

Values of, and relationships between or among, the constants a, b and c provide a basis for practical applications in technical improvements are achieved.

It is noted that the constants a and b are weights for similarities X and Y, respectively, and thus pertain to sematic data providing semantic descriptions of the data in the tables in the plurality of data systems. In contrast, the constant c is a weight for similarity Z and thus pertains to actual data in the tables in the plurality of data systems.

In applications in which only the semantic data is relevant, the constant c can be set to zero so that U is a function of only X and Y in accordance with U(X,Y)=aX+bY. In this embodiment, the relative weights a and b of similarities X and Y, respectively, are governed by the relative magnitude of the constants a and b. Further, an application can focus only on X by setting both c and b to zero so that U(X)=aX. Moreover, an application can focus only on Y by setting both c and a to zero so that U(Y)=bY.

In applications in which only the actual data, and not the semantic metadata, is relevant, the constants a and b can both be set to zero so that U(Z)=cZ.

In a first practical application with tables in data systems A and B, if X similarity>0.90, Y similarity>0.90, and Z similarity>0.90 in at least 95% of the column combination, then either the tables in data system A or the tables in data system B may be beneficially deleted from data system A or data system B, which results in a database improvement of reducing storage of redundant information and also avoids having to monitor and control data content and data integrity in the tables of both data system A and data system B. Thus, the data systems A and B within a computer system are improved.

In a second practical application with tables in data systems A and B, if X similarity>0.80, Y similarity>0.80, and Z similarity>0.80 in at least 90% of the column combinations, then computer time can be reduced for extraction of data from the tables in data systems A and B by reducing or eliminating extraction of redundant information from the tables in data systems A and B. Thus, a functionality of the computer system with respect to data extraction from data systems A and B is improved.

In a third practical application with tables in a data system, the embodiments of the present invention improve a computing accuracy for similarities X and Y for large amounts of data stored in the tables in comparison with manual computation of computing similarities X and Y, as illustrated in the following example.

Table 19 shows manual semantic metadata matching of columns and inventive semantic metadata matching of columns (i.e., via computer matching of columns via computation of X and Y for the columns according to the present invention) for a data system, which corresponds to setting c equal to zero so that U(X, Y)=aX+bY so as to focus on semantic metadata and not on actual data.

TABLE 19

| Semantic Metadata Matching | | | |
|---|---|---|---|
| Semantic Metadata Matching | Total Number of Columns | Number of Matching Columns | % Manual Matching |
| Manual | 60891 | 16848 | 27.6% |
| Inventive | 60891 | 17712 | 29.1% |

In Table 19, there are 864 more matches (i.e., 17712-16848) for the inventive semantic metadata matching in the data system than by the manual semantic metadata matching, which amounts to an increase in accuracy of 5.1% (i.e., 864/16848) by using the inventive semantic metadata matching rather than using the manual semantic metadata matching. The increased accuracy (5.1% in this example) is due to an inability of a human mind to practically perform the semantic metadata matching of large amounts of semantic metadata (i.e., semantic metadata matching for approximately 61000 columns in Table 19) without making errors. Thus, an accuracy of semantic metadata column comparisons of the computer system is improved.

In a fourth practical application with tables in data systems A and B, if X similarity>0.90, Y similarity>0.90, and Z similarity>0.90 in at least 90% of the column combinations, then computer searching of columns and/or tables in data systems A and B can be more efficient by tailoring search queries to data system specific searches of columns and tables where X and Y exceed 0.90, which enables the searches to be completed in less time than without using the methods of the present invention. Thus, a searching efficiency of the computer system is improved.

In a fifth practical application with tables in data systems A and B, if X similarity>0.90, Y similarity>0.80, and Z similarity>0.80 in at least 80% of the column combinations, then an ETL (Extract, Transform, Load) process can be performed in a manner that reduces an execution time of ETL scripts. For example, less data would need to be extracted in the Extract phase as explained supra in the second practical application which reduces computer execution for the Extract phase. In addition, the Transform phase applies rules with respect to data cleansing and other data functions to the extracted data and would execute in less computer time because the rules would be applied to a smaller set of data extracted in the Extract phase. Thus, an ETL execution efficiency of the computer system is improved.

FIG. 12 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
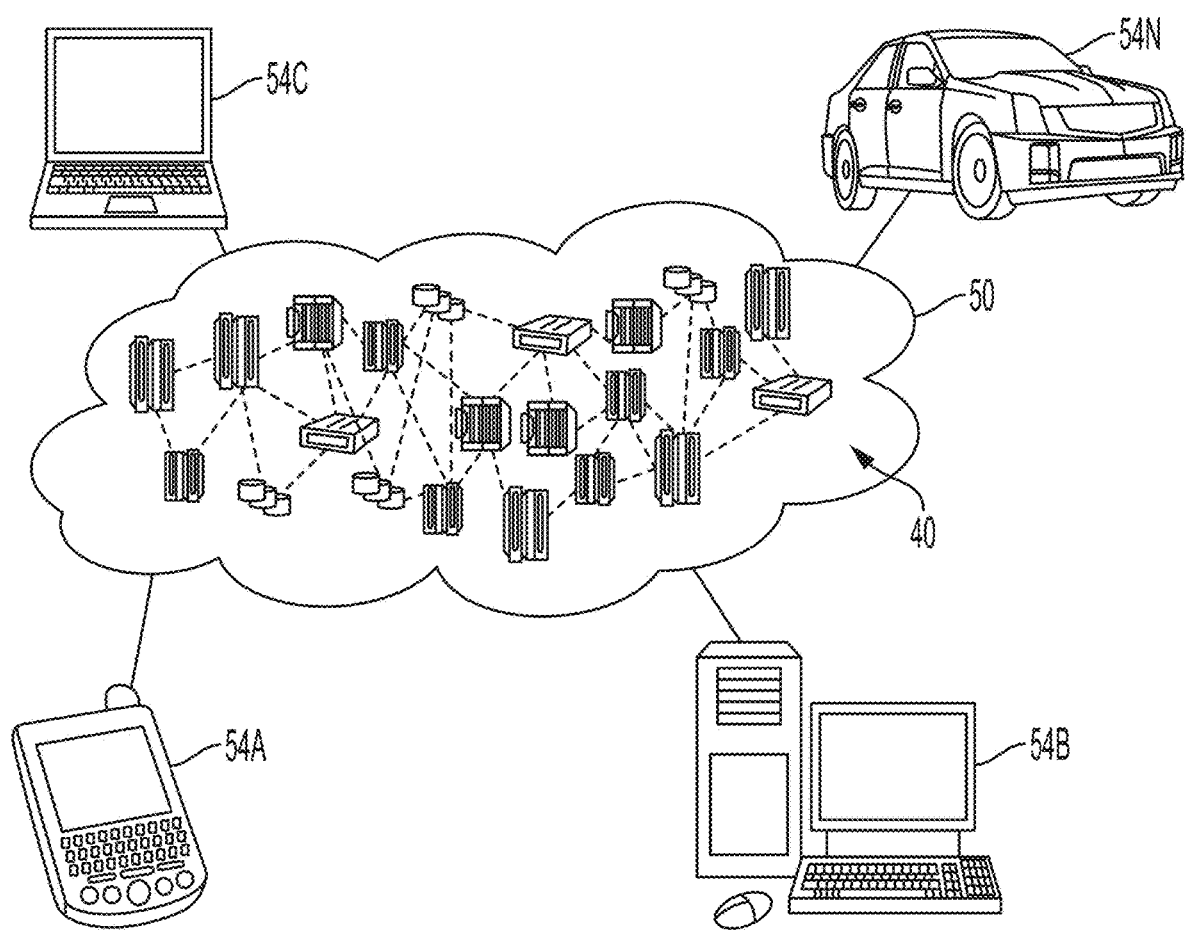
FIG. 13 depicts a cloud computing environment, in accordance with embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
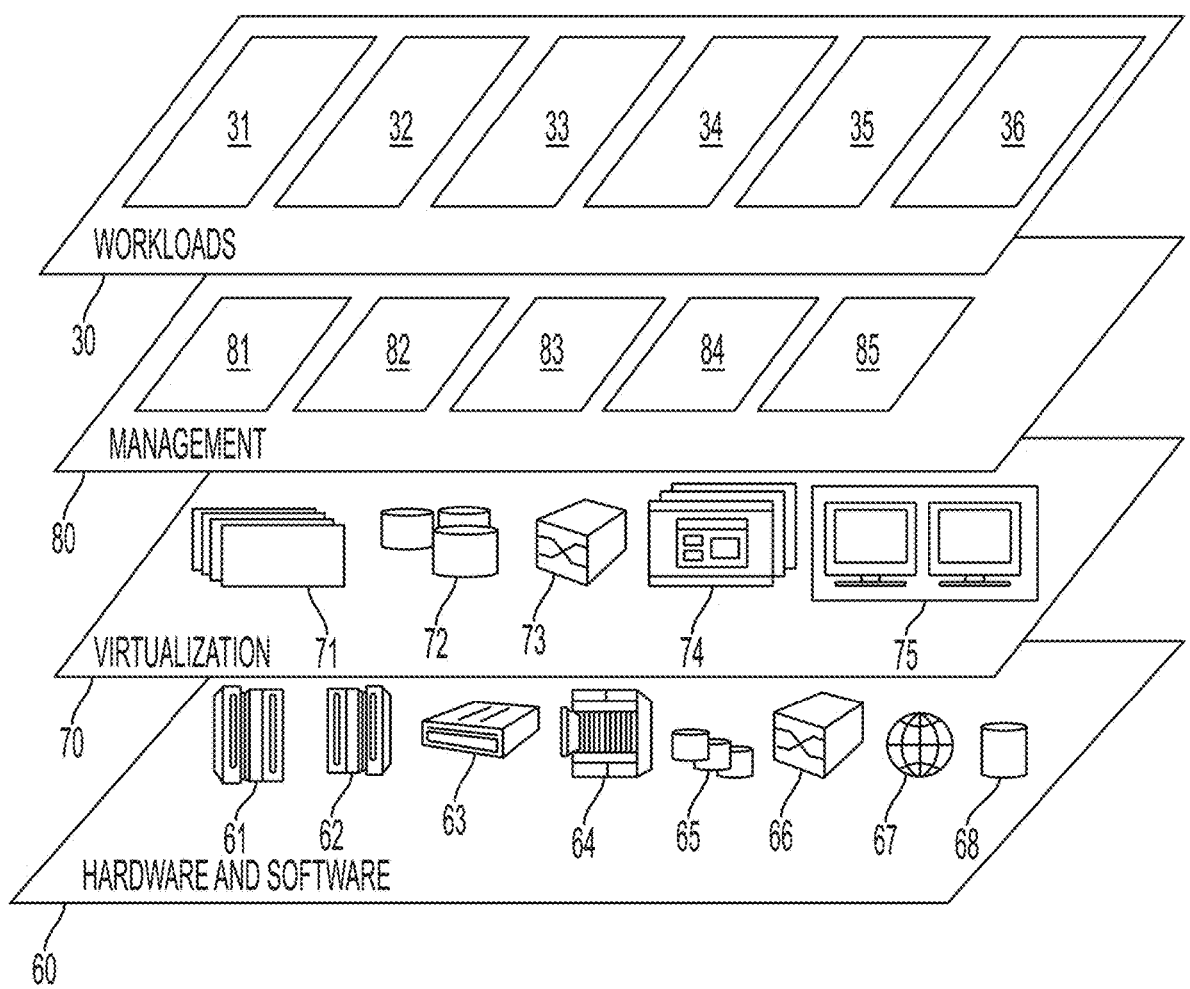
FIG. 14 depicts abstraction model layers, in accordance with embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and use of one or more similarities between data systems to improve a computer system 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for detection and utilization of similarities among tables in a plurality of data systems that include a first data system and a second data system, each data system being a different data system that comprises a plurality of tables, each table in each data system comprising a table title and a plurality of columns and multiple rows comprising a header row and a plurality of data rows, each header row comprising a column name for each column, each table title and each column name having semantic metadata comprising text, said method comprising:
generating, by one or more processors of a computer system, a semantic dataset comprising a set of keywords and a set of binary values of 1 or 0 denoting a presence or absence, respectively, of each keyword in the semantic metadata in the column names, each keyword in the set of keywords being a unique keyword within the set of keywords;
computing, by the one or more processors using the semantic dataset in conjunction with the semantic metadata in the column names, a first measure (X) of similarity between the columns in the tables in the first data system and the columns in the tables in the second data system;
computing, by the one or more processors using the semantic dataset in conjunction with the semantic metadata in the column names, a second measure (Y) of similarity between the columns in the tables in the first data system and the columns in the tables in the second data system, said first measure X and said second measure Y being different measures of similarity;
computing, by the one or more processors based on data in cells within columns in the tables in the both the first data system and the second data system, a third measure (Z) of similarity between the columns in the tables in the first data system and the columns of in the tables in the second data system;
computing, by the one or more processors, a weighted combination (U) of X, Y, and Z between the columns in the tables in the first data system and the columns in the tables in the second data system; and
using, by the one or more processors, one or more computed parameters selected from the group consisting of X, Y, Z, U and combinations thereof to implement a practical application that improves the computer system, wherein said using comprises using X, Y, and Z, and wherein X>0.90, Y>0.90, and Z>0.90 in at least 95% of combinations of a column in a first table in the first data system and a column in a second table in the second data system.

2. The method of claim 1, wherein said generating the semantic dataset comprises:
collecting semantic metadata, from the column names in the tables of the plurality of data systems, into a datapool of semantic metadata;
removing punctuation from the semantic metadata in the datapool;
removing stop words from the semantic metadata in the datapool, leaving a list of keywords in the datapool;
if one or more duplicate keywords do not exist in the list of keywords in the datapool, then o only unique keywords are in the list of keywords in the datapool, otherwise removing the one or more duplicate keywords from the list of keywords in the datapool so that only the unique keywords remain in the list of keywords in the datapool;
inserting the unique keywords in the list of keywords into a header row of the semantic dataset;
inserting the column names or identifiers of the column names, into a first column of the semantic dataset;
determining binary values denoting a presence or absence, in the column names, of keywords in the header row; and
populating cells of the semantic dataset with the binary values.

3. The method of claim 1, wherein the set of keywords in the semantic dataset further comprises semantic metadata existing in the table titles.

4. The method of claim 1, wherein for each combination of a column name of a first column in a first table in the first data system and a column name of a second column in a second table in the second data system, said computing X comprises:
determining a Euclidean distance DIST12 between the column name of the first column in the first table in the first data system and the column name of the second column in the second table in the second data system; and
if DIST12>0, then computing X as being equal to 1−ln(DIST12);
if DIST12=0, then setting X equal to a specified real number R greater than 1.

5. The method of claim 1, wherein for each combination of a column name of a first column in a first table in the first data system and a column name of a second column in a second table in the second data system, said computing Y comprises:
for each combination of one table in the first data system and an other table in the first data system, computing, using the semantic dataset, an average similarity value $SIM1_{AVE}$ between the one table in the first data system and the other table in the first data system;
for each combination of one table in the second data system and an other table in the second data system, computing, using the semantic dataset, an average similarity value $SIM2_{AVE}$ between the one table in the second data system and the other table in the second data system;

for each combination of the first table in the first data system and the second table in the second data system, computing, using the $SIM1_{AVE}$ values and the $SIM2_{AVE}$ values, a table similarity between the first table in the first data system and the second table in the second data system and (ii) setting Y equal to the computed table similarity.

6. The method of claim 5, wherein said computing $SIM1_{AVE}$ comprises: (i) for each column combination of a first column in the one table in the first data system and a second column in the other table in the first data system, computing, using the semantic dataset, a first Euclidean distance DIST1 between the column name of the first column in the one table in the first data system and the column name of the second column in the other table in the first data system and if DIST1>0 then computing a first similarity SIM1 as being equal to 1−ln (DIST1) and if DIST1=0 then setting SIM1 equal to a specified real number R1 greater than 1 and (ii) computing $SIM1_{AVE}$ as an arithmetic average of all of the SIM1 values of all column combinations between the one table in the first data system and the other table in the first data system; and wherein said computing $SIM2_{AVE}$ comprises: (i) for each column combination of a first column in the one table in the second data system and a second column in the other table in the second data system, computing, using the semantic dataset, a second Euclidean distance DIST2 between the column name of the first column in the one table in the second data system and the column name of the second column in the other table in the second data system and if DIST2>0 then computing a second similarity SIM2 as being equal to 1−ln (DIST2) and if DIST2=0 then setting SIM2 equal to a specified real number R2 greater than 1 and (ii) computing $SIM2_{AVE}$ as an arithmetic average of all of the SIM values of all column combinations between the one table in the second data system and the other table in the second data system.

7. The method of claim 5, wherein for each combination of the first table in the first data system and the second table in the second data system, and wherein said computing the table similarity between the first table in the first data system and the second table in the second data system comprises computing, using the $SIM1_{AVE}$ values and the $SIM2_{AVE}$ values, a cosine similarity between the first table in the first data system and the second table in the second data system.

8. The method of claim 1, wherein for each column combination of a first column in a first table in the first data system and a second column in a second table in the second data system, said computing Z comprises:

ascertaining whether the column combination is between text columns, between numeric columns, or between a text column and a numeric column;

if said ascertaining ascertains that the column combination is between a text column and a numeric column, then said computing Z comprises setting Z to zero;

if said ascertaining ascertains that the column combination is between text columns, then said computing Z comprises computing Z based on common data in respective subsets of columns in the column combination;

if said ascertaining ascertains that the column combination is between numeric columns, then said computing Z comprises computing Z as a function of an inter-column distance between respective subsets of columns in the column combination.

9. The method of claim 8, wherein said ascertaining ascertains that the column combination is between text columns, and wherein said computing Z comprises:

if one or more duplicate entries exist in the first column, then removing the one or more duplicate entries in the first column;

if one or more duplicate entries exist in the second column, then removing the one or more duplicate entries in the second column;

determining a first subset of the text data in the first column by accepting or rejecting each text datum in the first column via a first random sampling process;

determining a second subset of the text data in the second column by accepting or rejecting each text datum in the second column via a second random sampling process, wherein the first subset and the second subset have fewer text values than do the text data in the first column and the second column, respectively;

if the first subset and the second subset have a different number of elements, then adjusting the first subset or the second subset to constrain the first subset and the second subset to have a same number of elements;

computing Z as equal to NC/NT, wherein NC denotes a total number of common elements between the first subset and the second subset, and wherein NT denotes a total number elements in each subset of the first subset and the second subset.

10. The method of claim 8, wherein said ascertaining ascertains that the column combination is between numeric columns, and wherein said computing Z comprises:

generating a first probability density function (PDF) representing first numeric data in the first column and a second PDF representing second numeric data in the second column;

generating a first subset of the first column by accepting or rejecting each numeric datum in the first column via first rejection sampling;

generating a second subset of the second column by accepting or rejecting each numeric datum in the second column via second rejection sampling;

computing a medcouple of the first subset and the second subset and iteratively regenerating the first subset and/or the second subset if the absolute value of the respective medcouple exceeds a specified medcouple threshold until the absolute value of the respective medcouple is less than the specified medcouple threshold;

determining a first subset PDF representing the first subset and determining a second subset PDF representing the second subset;

computing an inter-column distance D between the first subset PDF and the second subset PDF, wherein D is based on a Kullback-Leibler divergence between the first subset PDF and the second subset PDF;

setting Z equal to 1−D.

11. The method of claim 10, wherein the first rejection sampling comprises for each first element of the first numeric data in the first column: picking a first random number uniformly distributed between zero and a first peak of the first PDF, accepting the first element if the first random number does not exceed a value of the first PDF at the first element, and rejecting the first element if the first random number exceeds the value of the first PDF at the first element;

wherein the second rejection sampling comprises for each second element of the second numeric data in the second column: picking a second random number uniformly distributed between zero and a second peak of the second PDF, accepting the second element if the second random number does not exceed a value of the second PDF at the second element, and rejecting the second element if the second random number exceeds the value of the second PDF at the second element.

12. The method of claim 10, wherein P and Q respectively denote the first subset PDF and the second subset PDF, wherein D is selected from the group consisting of $D_{KL}$(P∥Q), $D_{KL}$(Q∥P), and ½ (DKL(P∥Q)+$D_{KL}$(Q∥P), wherein $D_{KL}$(P∥Q) denotes the Kullback-Leibler divergence of P from Q, and wherein $D_{KL}$(Q∥P) denotes the Kullback-Leibler divergence of Q from P.

13. A computer program product, comprising one or more computer readable hardware storage devices having computer readable program code stored therein, said program code containing instructions executable by one or more processors of a computer system to implement a method for detection and utilization of similarities among tables in a plurality of data systems that include a first data system and a second data system, each data system being a different data system that comprises a plurality of tables, each table in each data system comprising a table title and a plurality of columns and multiple rows comprising a header row and a plurality of data rows, each header row comprising a column name for each column, each table title and each column name having semantic metadata comprising text, said method comprising:

generating, by one or more processors, a semantic dataset comprising a set of keywords and a set of binary values of 1 or 0 denoting a presence or absence, respectively, of each keyword in the semantic metadata in the column names, each keyword in the set of keywords being a unique keyword within the set of keywords;

computing, by the one or more processors using the semantic dataset in conjunction with the semantic metadata in the column names, a first measure (X) of similarity between the columns in the tables in the first data system and the columns in the tables in the second data system;

computing, by the one or more processors using the semantic dataset in conjunction with the semantic metadata in the column names, a second measure (Y) of similarity between the columns in the tables in the first data system and the columns in the tables in the second data system, said first measure X and said second measure Y being different measures of similarity;

computing, by the one or more processors based on data in cells within columns in the tables in the both the first data system and the second data system, a third measure (Z) of similarity between the columns in the tables in the first data system and the columns of in the tables in the second data system;

computing, by the one or more processors, a weighted combination (U) of X, Y, and Z between the columns in the tables in the first data system and the columns in the tables in the second data system; and using, by the one or more processors, one or more computed parameters selected from the group consisting of X, Y, Z, U and combinations thereof to implement a practical application that improves the computer system, wherein said using comprises using X, Y, and Z, and wherein X>0.90, Y>0.90, and Z>0.90 in at least 95% of combinations of a column in a first table in the first data system and a column in a second table in the second data system.

14. The computer program product of claim 13, wherein for each combination of a column name of a first column in a first table in the first data system and a column name of a second column in a second table in the second data system, said computing X comprises:

determining a Euclidean distance DIST12 between the column name of the first column in the first table in the first data system and the column name of the second column in the second table in the second data system; and if DIST12>0, then computing X as being equal to 1−ln (DIST12);

if DIST12=0, then setting X equal to a specified real number R greater than 1.

15. The computer program product of claim 13, wherein for each combination of a column name of a first column in a first table in the first data system and a column name of a second column in a second table in the second data system, said computing Y comprises:

for each combination of one table in the first data system and an other table in the first data system, computing, using the semantic dataset, an average similarity value $SIM1_{AVE}$ between the one table in the first data system and the other table in the first data system;

for each combination of one table in the second data system and an other table in the second data system, computing, using the semantic dataset, an average similarity value $SIM2_{AVE}$ between the one table in the second data system and the other table in the second data system;

for each combination of the first table in the first data system and the second table in the second data system, computing, using the $SIM1_{AVE}$ values and the $SIM2_{AVE}$ values, a table similarity between the first table in the first data system and the second table in the second data system and (ii) setting Y equal to the computed table similarity.

16. The computer program product of claim 13, wherein for each column combination of a first column in a first table in the first data system and a second column in a second table in the second data system, said computing Z comprises:

ascertaining whether the column combination is between text columns, between numeric columns, or between a text column and a numeric column;

if said ascertaining ascertains that the column combination is between a text column and a numeric column, then said computing Z comprises setting Z to zero;

if said ascertaining ascertains that the column combination is between text columns, then said computing Z comprises computing Z based on common data in respective subsets of columns in the column combination;

if said ascertaining ascertains that the column combination is between numeric columns, then said computing Z comprises computing Z as a function of an inter-column distance between respective subsets of columns in the column combination.

17. A computer system, comprising one or more processors, one or more memories, and one or more computer readable hardware storage devices, said one or more hardware storage devices containing program code executable by the one or more processors via the one or more memories to implement a method for detection and utilization of similarities among tables in a plurality of data systems that include a first data system and a second data system, each data system being a different data system that comprises a plurality of tables, each table in each data system comprising a table title and a plurality of columns and multiple rows comprising a header row and a plurality of data rows, each header row comprising a column name for each column, each table title and each column name having semantic metadata comprising text, said method comprising:

generating, by one or more processors, a semantic dataset comprising a set of keywords and a set of binary values of 1 or 0 denoting a presence or absence, respectively, of each keyword in the semantic metadata in the column names, each keyword in the set of keywords being a unique keyword within the set of keywords;

computing, by the one or more processors using the semantic dataset in conjunction with the semantic metadata in the column names, a first measure (X) of similarity between the columns in the tables in the first data system and the columns in the tables in the second data system;

computing, by the one or more processors using the semantic dataset in conjunction with the semantic metadata in the column names, a second measure (Y) of similarity between the columns in the tables in the first data system and the columns in the tables in the second data system, said first measure X and said second measure Y being different measures of similarity;

computing, by the one or more processors based on data in cells within columns in the tables in the both the first data system and the second data system, a third measure (Z) of similarity between the columns in the tables in the first data system and the columns of in the tables in the second data system;

computing, by the one or more processors, a weighted combination (U) of X, Y, and Z between the columns in the tables in the first data system and the columns in the tables in the second data system; and using, by the one or more processors, one or more computed parameters selected from the group consisting of X, Y, Z, U and combinations thereof to implement a practical application that improves the computer system, wherein said using comprises using X, Y, and Z, and wherein X>0.90, Y>0.90, and Z>0.90 in at least 95% of combinations of a column in a first table in the first data system and a column in a second table in the second data system a first table in the first data system and an other column in a second table in the second data system.

18. The computer system of claim 17, wherein for each combination of a column name of a first column in a first table in the first data system and a column name of a second column in a second table in the second data system, said computing X comprises:

determining a Euclidean distance DIST12 between the column name of the first column in the first table in the first data system and the column name of the second column in the second table in the second data system; and if DIST12>0, then computing X as being equal to 1−ln (DIST12);

if DIST12=0, then setting X equal to a specified real number R greater than 1.

19. The computer system of claim 17, wherein for each combination of a column name of a first column in a first table in the first data system and a column name of a second column in a second table in the second data system, said computing Y comprises:

for each combination of one table in the first data system and an other table in the first data system, computing, using the semantic dataset, an average similarity value $SIM1_{AVE}$ between the one table in the first data system and the other table in the first data system;

for each combination of one table in the second data system and an other table in the second data system, computing, using the semantic dataset, an average similarity value $SIM2_{AVE}$ between the one table in the second data system and the other table in the second data system;

for each combination of the first table in the first data system and the second table in the second data system, computing, using the $SIM1_{AVE}$ values and the $SIM2_{AVE}$ values, a table similarity between the first table in the first data system and the second table in the second data system and (ii) setting Y equal to the computed table similarity.

20. The computer system of claim 17, wherein for each column combination of a first column in a first table in the first data system and a second column in a second table in the second data system, said computing Z comprises:

ascertaining whether the column combination is between text columns, between numeric columns, or between a text column and a numeric column;

if said ascertaining ascertains that the column combination is between a text column and a numeric column, then said computing Z comprises setting Z to zero;

if said ascertaining ascertains that the column combination is between text columns, then said computing Z comprises computing Z based on common data in respective subsets of columns in the column combination;

if said ascertaining ascertains that the column combination is between numeric columns, then said computing Z comprises computing Z as a function of an inter-column distance between respective subsets of columns in the column combination.

* * * * *